US012212063B2

(12) United States Patent
Park et al.

(10) Patent No.: US 12,212,063 B2
(45) Date of Patent: Jan. 28, 2025

(54) DUAL BAND ANTENNA AND ELECTRONIC DEVICE INCLUDING THE SAME

(71) Applicant: Samsung Electronics Co., Ltd., Suwon-si (KR)

(72) Inventors: Seongjin Park, Suwon-si (KR); Dongyeon Kim, Suwon-si (KR); Hosaeng Kim, Suwon-si (KR); Sumin Yun, Suwon-si (KR); Woomin Jang, Suwon-si (KR); Myunghun Jeong, Suwon-si (KR); Jehun Jong, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/311,500

(22) Filed: May 3, 2023

(65) Prior Publication Data

US 2023/0318202 A1 Oct. 5, 2023

Related U.S. Application Data

(63) Continuation of application No. 17/859,597, filed on Jul. 7, 2022, now Pat. No. 11,664,603, which is a
(Continued)

(30) Foreign Application Priority Data

May 10, 2019 (KR) ........................ 10-2019-0055319

(51) Int. Cl.
*H01Q 5/35* (2015.01)
*H01Q 1/24* (2006.01)
(Continued)

(52) U.S. Cl.
CPC ......... *H01Q 21/0025* (2013.01); *H01Q 1/243* (2013.01); *H01Q 5/35* (2015.01);
(Continued)

(58) Field of Classification Search
CPC ...... H01Q 21/0025; H01Q 1/243; H01Q 5/35; H01Q 9/045; H01Q 21/065; H01Q 21/24
See application file for complete search history.

(56) References Cited

U.S. PATENT DOCUMENTS 6,121,931 A 9/2000 Levi
8,102,330 B1 1/2012 Albers
(Continued)

FOREIGN PATENT DOCUMENTS

CN 102714357 A 10/2012
CN 107004958 A 8/2017
(Continued)

OTHER PUBLICATIONS

International Search Report dated Aug. 13, 2020, issued in International Application No. PCT/KR2020/005879.
(Continued)

*Primary Examiner* — Dieu Hien T Duong
(74) *Attorney, Agent, or Firm* — Jefferson IP Law, LLP

(57) ABSTRACT

An electronic device is provided. The electronic devices includes a housing at least partially including a conductive portion, an antenna structure including a printed circuit board including a plurality of insulating layers, at least one first conductive patch including a first feeding point, and a second feeding point, and at least one second conductive patch including a third feeding point, and a fourth feeding point, and an antenna module including a wireless communication circuit configured to transmit or receive a first signal through the at least one first conductive patch and to transmit or receive a second signal of a second frequency band through the at least one second conductive patch.

20 Claims, 33 Drawing Sheets

Related U.S. Application Data continuation of application No. 16/865,811, filed on May 4, 2020, now Pat. No. 11,387,569.

(51) Int. Cl.

| | |
|---|---|
| ***H01Q 9/04*** | (2006.01) |
| ***H01Q 21/00*** | (2006.01) |
| ***H01Q 21/06*** | (2006.01) |
| ***H01Q 21/24*** | (2006.01) |

(52) U.S. Cl.

CPC ........... *H01Q 9/045* (2013.01); *H01Q 21/065* (2013.01); *H01Q 21/24* (2013.01)

(56) References Cited

U.S. PATENT DOCUMENTS

| | | | |
|---|---|---|---|
| 11,387,569 | B2 * | 7/2022 | Park ..................... H01Q 21/065 |
| 2011/0128201 | A1 | 6/2011 | Ju et al. |
| 2012/0287019 | A1 | 11/2012 | Sudo et al. |
| 2015/0249283 | A1 | 9/2015 | Watanabe et al. |
| 2015/0288057 | A1 | 10/2015 | Shimura et al. |
| 2017/0125887 | A1 | 5/2017 | Park et al. |
| 2017/0317402 | A1 | 11/2017 | Hwang et al. |
| 2018/0241115 | A1 | 8/2018 | Cho et al. |
| 2018/0294548 | A1 | 10/2018 | Kang et al. |
| 2019/0020110 | A1 | 1/2019 | Paulotto et al. |
| 2019/0020121 | A1 | 1/2019 | Paulotto et al. |
| 2019/0027802 | A1 | 1/2019 | Noori et al. |
| 2019/0036231 | A1 | 1/2019 | Ryu et al. |
| 2019/0067801 | A1 | 2/2019 | Kang et al. |
| 2019/0081414 | A1 | 3/2019 | Kao et al. |
| 2019/0098750 | A1 | 3/2019 | Woo |
| 2019/0386393 | A1 * | 12/2019 | Chiang .................... H01Q 5/28 |
| 2020/0021019 | A1 * | 1/2020 | Rajagopalan ........ H01Q 1/2291 |

FOREIGN PATENT DOCUMENTS

| | | | |
|---|---|---|---|
| CN | 107534207 | A | 1/2018 |
| CN | 108696607 | A | 10/2018 |
| KR | 10-0964117 | B1 | 6/2010 |
| KR | 10-2011-0060716 | A | 6/2011 |
| KR | 10-2011-0089901 | A | 8/2011 |
| KR | 10-2014-0095131 | A | 8/2014 |

OTHER PUBLICATIONS

European Search Report dated Sep. 23, 2020, issued in European Application No. 20172800.3-1205.

Chinese Office Action dated Dec. 7, 2023, issued in Chinese Application No. 202010379614.0.

Korean Notice of Allowance dated Jan. 29, 2024, issued in Korean Application No. 10-2019-0055319.

* cited by examiner

−45 pol. Gain @ HB

+45 pol. Gain @ LB

−45 pol. Gain @ LB

+45 pol.

-45 pol.

DUAL BAND ANTENNA AND ELECTRONIC DEVICE INCLUDING THE SAME

CROSS-REFERENCE TO RELATED APPLICATION(S)

This application is a continuation application of prior application Ser. No. 17/859,597, filed on Jul. 7, 2022, which is a continuation application of prior application Ser. No. 16/865,811, filed on May 4, 2020, which has issued as U.S. Pat. No. 11,387,569 on Jul. 12, 2022, which is based on and claimed priority under 35 U.S.C § 119 (a) of a Korean patent application number 10-2019-0055319, filed on May 10, 2019, in the Korean Intellectual Property Office, the disclosure of which is incorporated by reference herein in its entirety.

BACKGROUND

1. Field

The disclosure relates to a dual band antenna and an electronic device including the same.

2. Description of Related Art

With the development of wireless communication technology, electronic devices (e.g., communication electronic devices) are commonly used in daily life; thus, use of content is increasing exponentially. Because of such rapid increase in the use of content, a network capacity is reaching its limit. After commercialization of 4th generation (4G) communication systems, in order to meet growing wireless data traffic demand, a communication system (e.g., 5th generation (5G) or pre-5G communication system, or new radio (NR))) that transmits and/or receives signals using a frequency of a high frequency (e.g., millimeter wave (mm Wave)) band (e.g., 3 GHz to 300 GHz band) is being studied.

Next generation wireless communication technology may transmit and receive signals using a frequency in a range of substantially 3 GHz to 100 GHz, and an efficient mounting structure for overcoming a high free space loss by frequency characteristics and increasing a gain of an antenna and a new antenna structure corresponding thereto are being developed.

However, when a conductive member (e.g., conductive side member) is disposed around the antenna structure, the antenna structure may cause a decrease in antenna performance due to a gain difference by a distance difference between each feeding point and the conductive member.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a dual band antenna and an electronic device including the same.

Another aspect of the disclosure is to provide a dual band antenna and an electronic device including the same configured to exhibit even radiation characteristics in each frequency band even when conductive members are disposed around an antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a housing at least partially including a conductive portion, an antenna structure disposed in an internal space of the housing, wherein the antenna structure includes a printed circuit board including a plurality of insulating layers, at least one first conductive patch disposed at a first insulating layer of the plurality of insulating layers, wherein the at least one first conductive patch includes a first feeding point disposed on a first imaginary line passing through the center of the first conductive patch, and a second feeding point passing through the center and disposed on a second imaginary line perpendicular to the first imaginary line, wherein the first feeding point and the second feeding point have a same first vertical distance from a first side of the printed circuit board adjacent to the conductive portion, and at least one second conductive patch overlapped at least partially so as to have the same center as that of the first conductive patch when viewed from above the first conductive patch in a second insulating layer different from the first insulating layer, wherein the at least one second conductive patch includes a third feeding point disposed on the first imaginary line, and a fourth feeding point disposed on the second imaginary line, wherein the third feeding point and the fourth feeding point have the same second vertical distance longer than the first vertical distance from the first side, and an antenna module including a wireless communication circuit configured to transmit and/or receive a first signal of a first frequency band through the at least one first conductive patch, and transmit and/or receive a second signal of a second frequency band lower than the first frequency band through the at least one second conductive patch.

In accordance with another aspect of the disclosure, an electronic device is provided. The electronic device includes a housing, a conductive member included in the housing or disposed inside the housing, an antenna structure disposed in an internal space of the housing, wherein the antenna structure includes a printed circuit board including a plurality of insulating layers, at least one first conductive patch disposed at a first insulating layer of the plurality of insulating layers and including a first feeding point spaced apart from the conductive member by a first distance, at least one second conductive patch at least partially overlapped to have the same center as that of the first conductive patch and including a second feeding point spaced apart from the conductive member by a second distance longer than the first distance, when viewed from above the first conductive patch in a second insulating layer different from the first insulating layer, and a wireless communication circuit electrically connected to the first feeding point and the second feeding point, and configured to transmit and/or receive a first signal of a first frequency band through the first conductive patch, and transmit and/or receive a second signal of a second frequency band lower than the first frequency band through the second conductive patch.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

Figure 1:
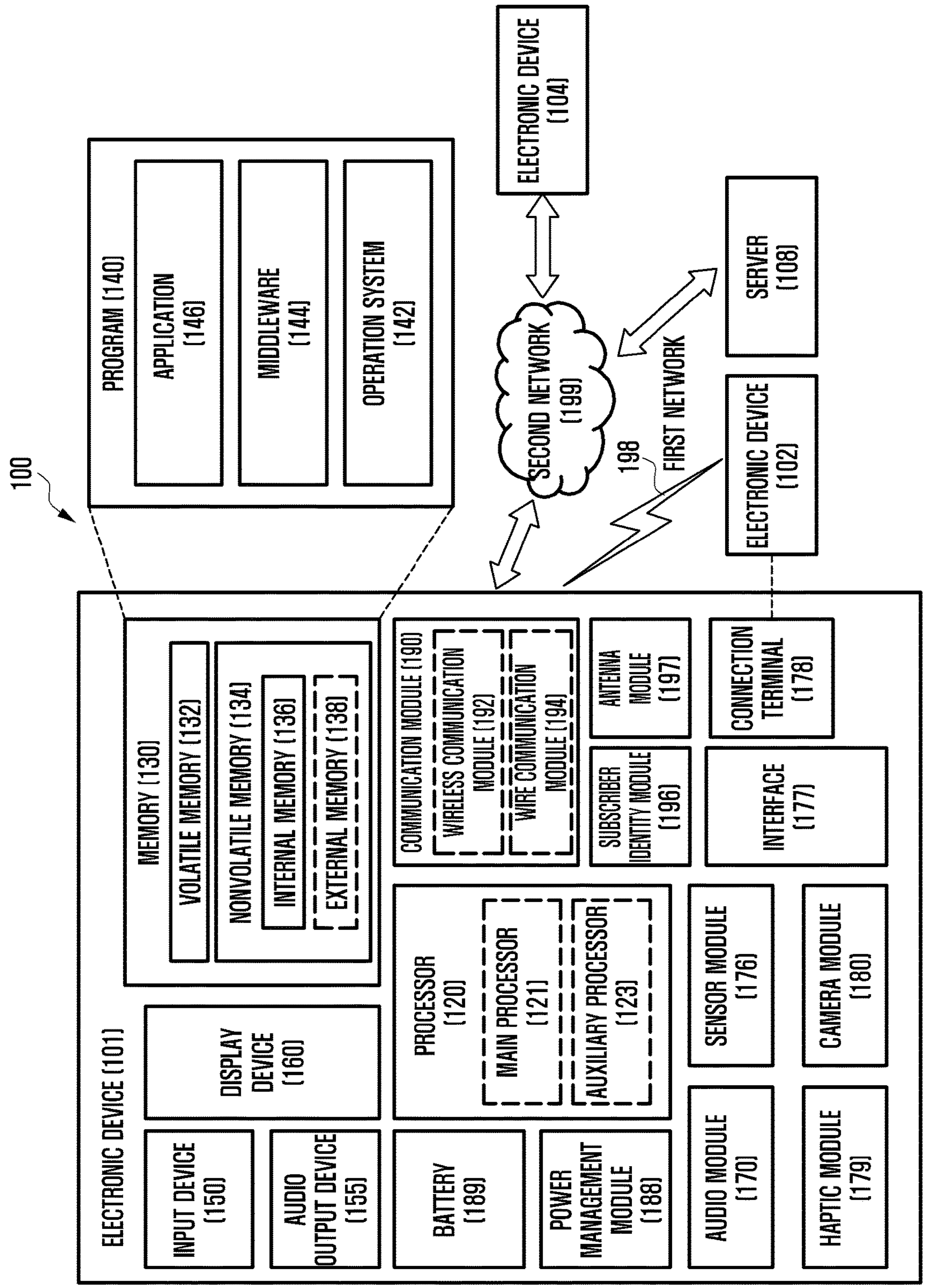
FIG. 1 is a block diagram illustrating an electronic device in a network environment according to an embodiment of the disclosure.

Thus, for example, reference to "a component surface" includes reference to one or more of such surfaces FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C” may include any one of, or all possible combinations of the items enumerated together in a corresponding one of the phrases.

As used herein, such terms as “Ist” and “2nd,” or “first” and “second” may be used to simply distinguish a corresponding component from another, and does not limit the components in other aspect (e.g., importance or order). If an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., wiredly), wirelessly, or via a third element.

The term “module” may include a unit implemented in hardware, software, or firmware, and may interchangeably be used with other terms, for example, “logic,” “logic block,” “part,” or “circuitry.” A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
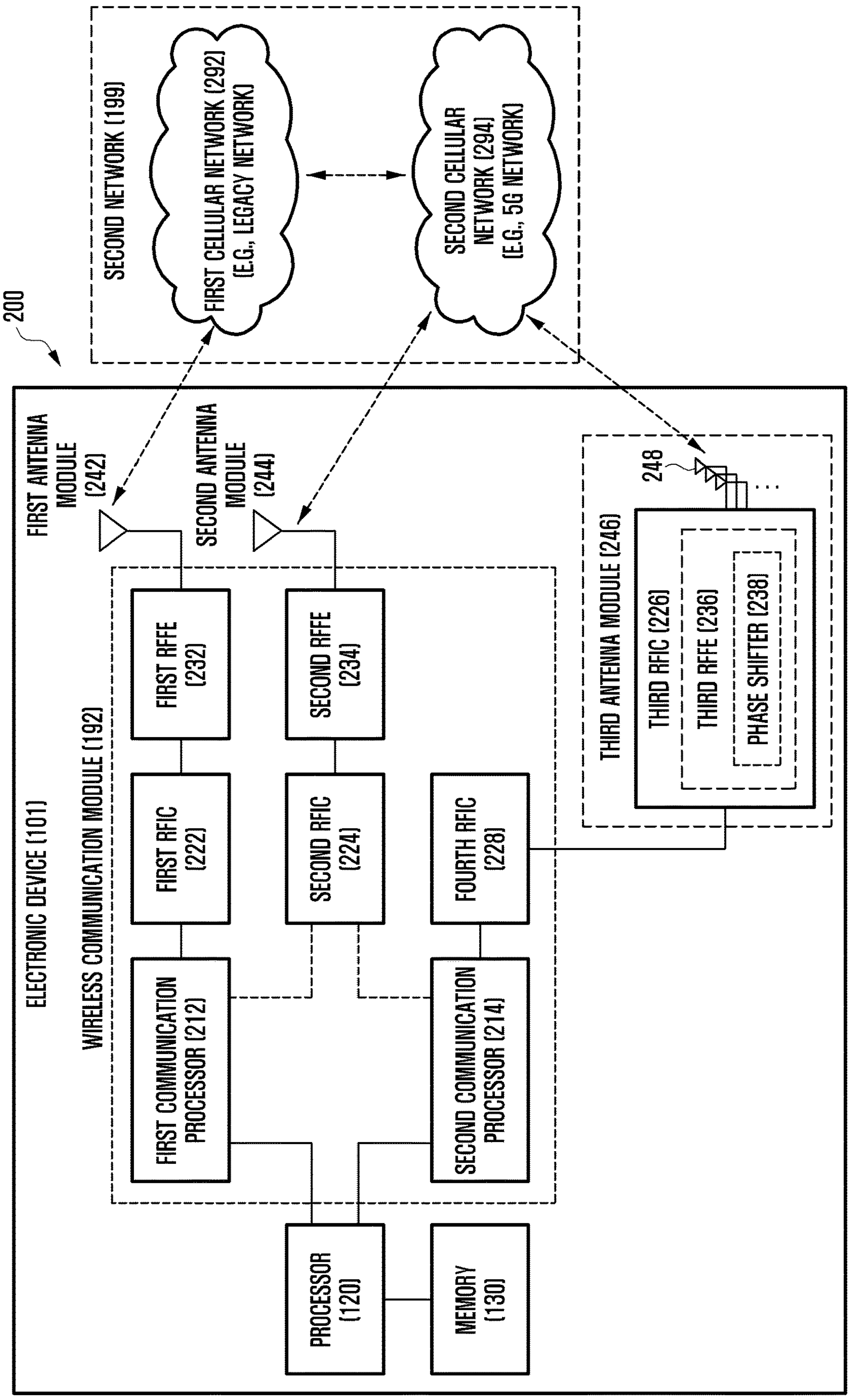
FIG. 2 is a block diagram illustrating an electronic device for supporting legacy network communication and 5th generation (5G) network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHZ) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHZ) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
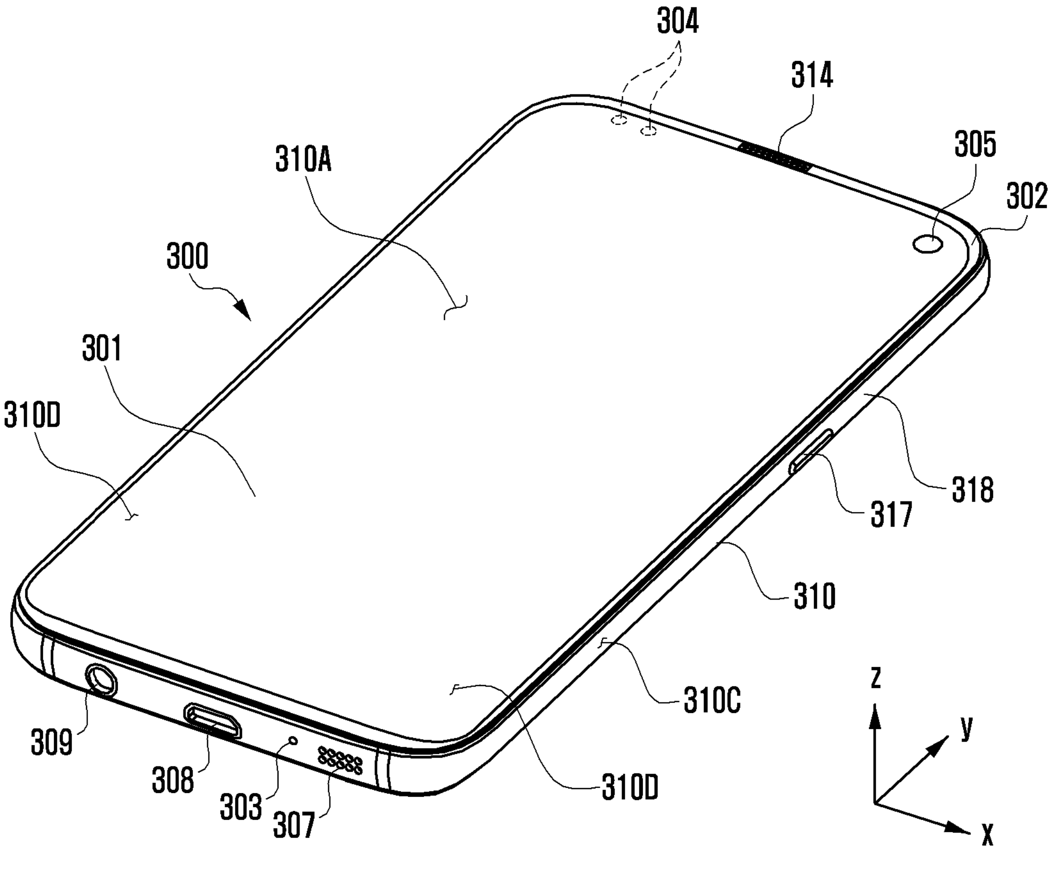
FIG. 3A is a perspective view illustrating a mobile electronic device according to an embodiment of the disclosure.
Figure 3B:
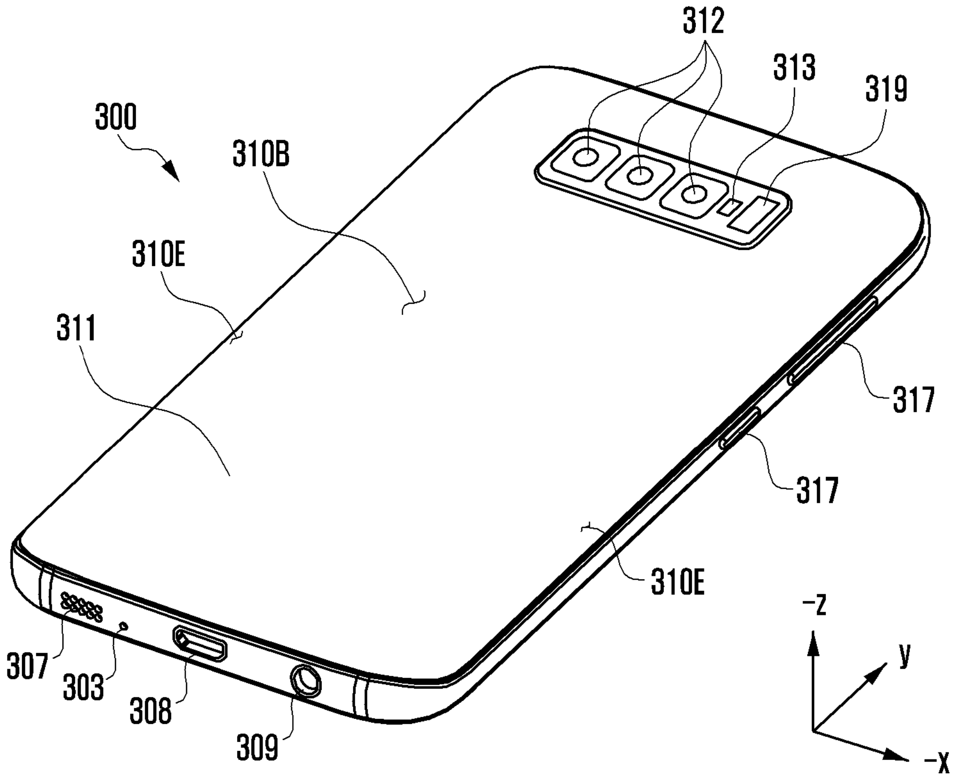
FIG. 3B is a rear perspective view illustrating a mobile electronic device according to an embodiment of the disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

A recess or opening may be formed in a portion of a display area of the display 301 to accommodate at least one of the audio module 314, the sensor module 304, the camera module 305, and the light emitting device. At least one of the audio module 314, the sensor module 304, the camera module 305, a fingerprint sensor (not shown), and the light emitting element may be disposed on the back of the display area of the display 301. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

FIG. 3A illustrates an exploded perspective view showing a mobile electronic device shown in FIG. 3A according to an embodiment of the disclosure.

Figure 3C:
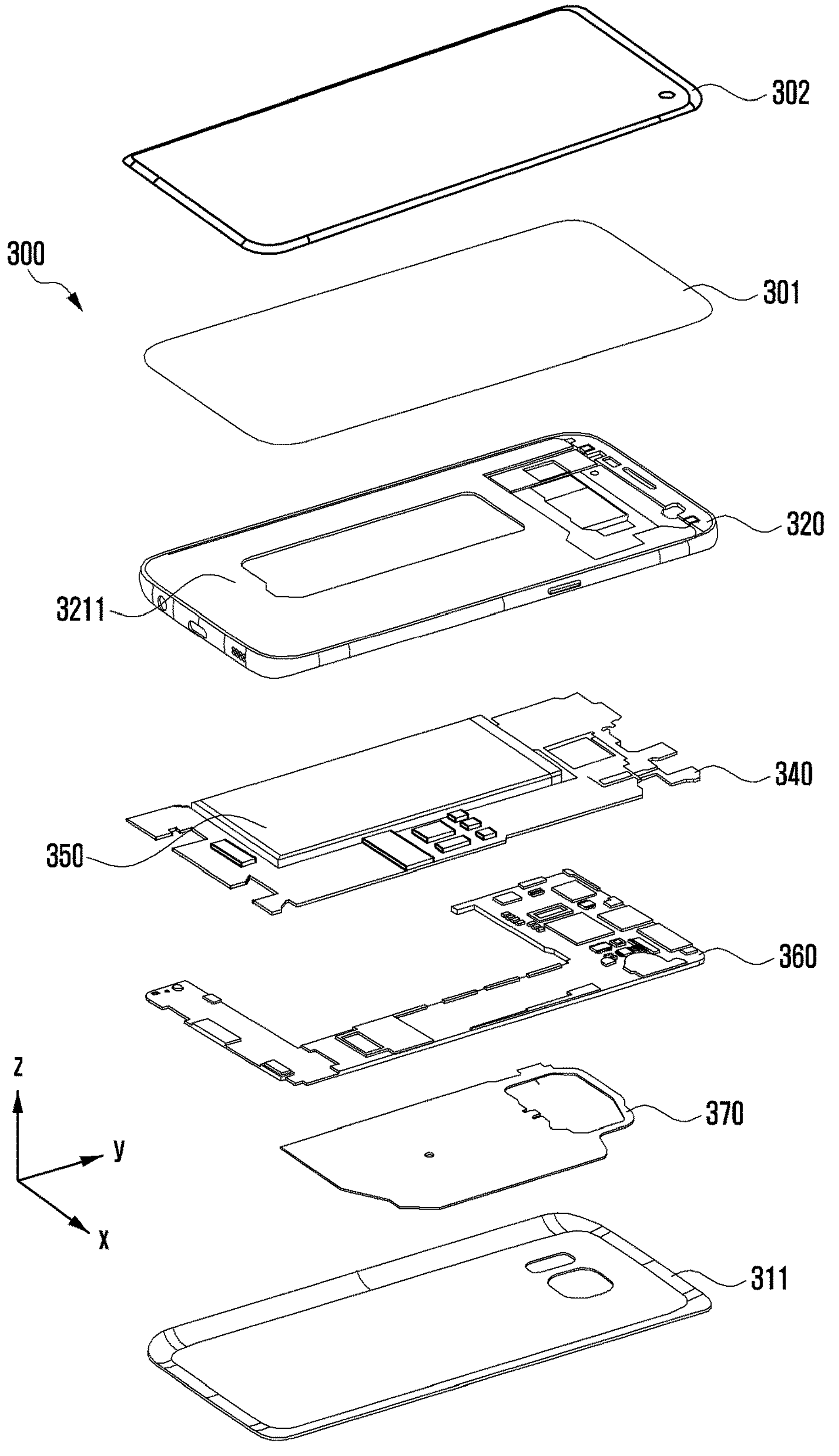
FIG. 3C is an exploded perspective view illustrating a mobile electronic device according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly.

An antenna structure may be formed by a part or combination of the lateral bezel structure 320 and/or the first support member 3211.

Figure 4A:
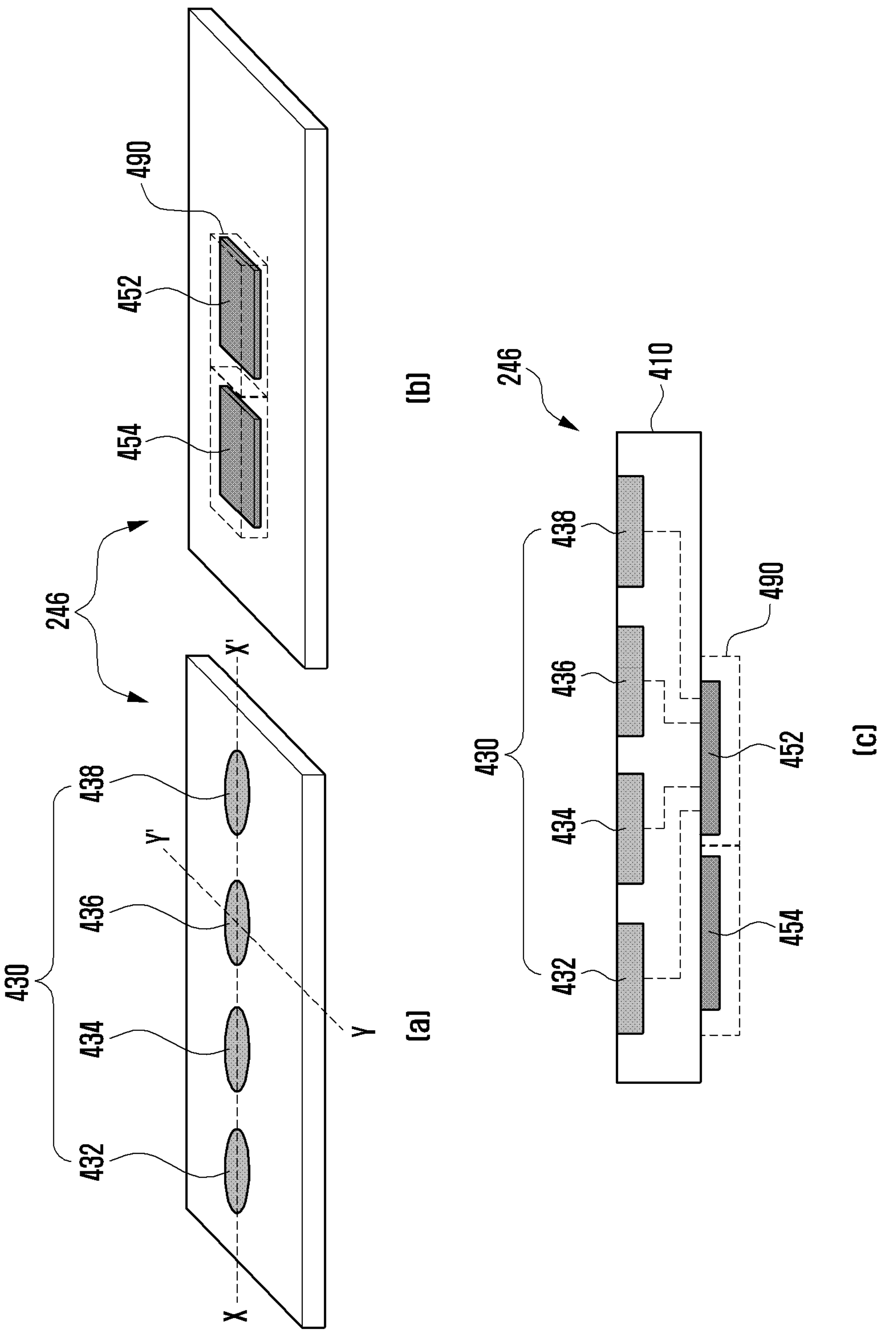
FIG. 4A is a diagram illustrating an embodiment of a structure of a third antenna module described with reference to FIG. 2 according to an embodiment of the disclosure.

FIG. 4A is a diagram illustrating a structure of, for example, a third antenna module described with reference to FIG. 2 according to an embodiment of the disclosure.

Referring to FIG. 4A (a) is a perspective view illustrating the third antenna module 246 viewed from one side, and FIG. 4A (b) is a perspective view illustrating the third antenna module 246 viewed from the other side. FIG. 4A (c) is a cross-sectional view illustrating the third antenna module 246 taken along line X-X' of FIG. 4A.

With reference to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHZ) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
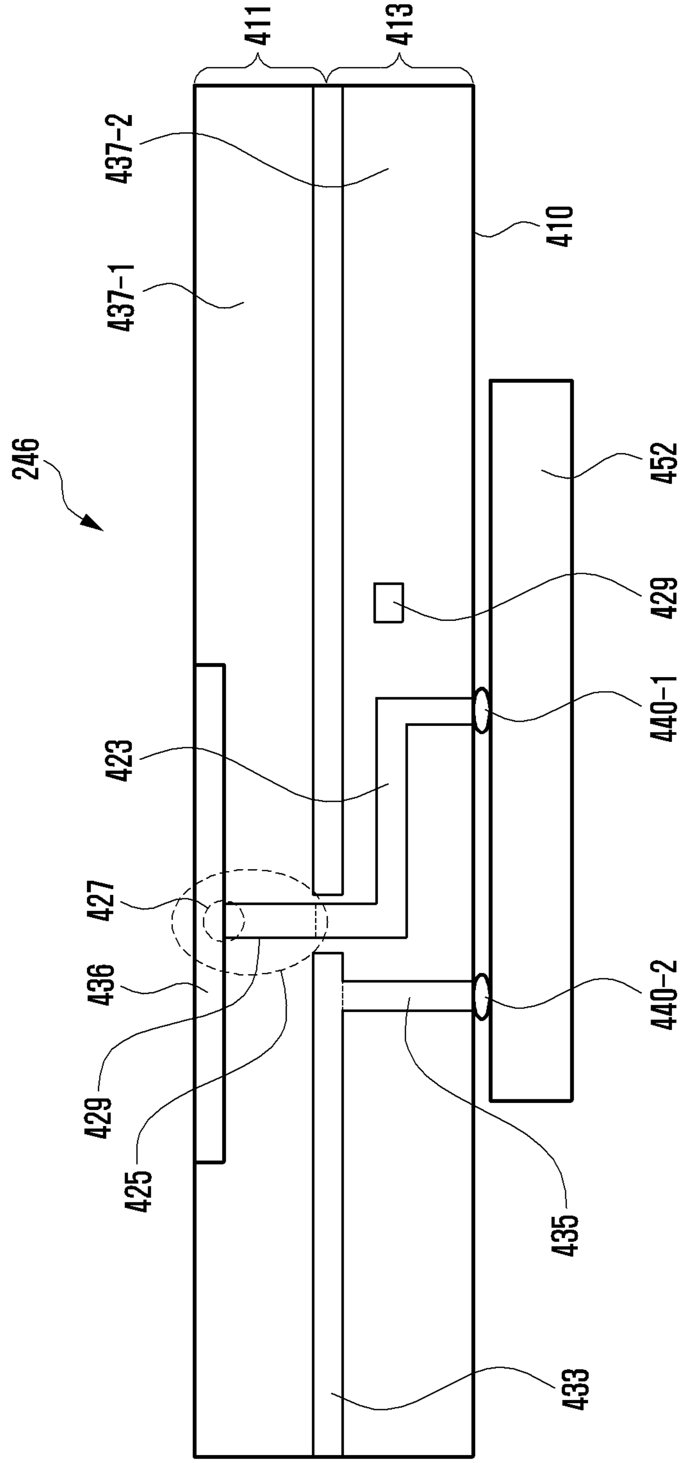
FIG. 4B is a cross-sectional view taken along line Y-Y' of a third antenna module illustrated in FIG. 4A (a) according to an embodiment of the disclosure.

FIG. 4B is a cross-sectional view illustrating the third antenna module 246 taken along line Y-Y' of FIG. 4A (a) according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A (c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
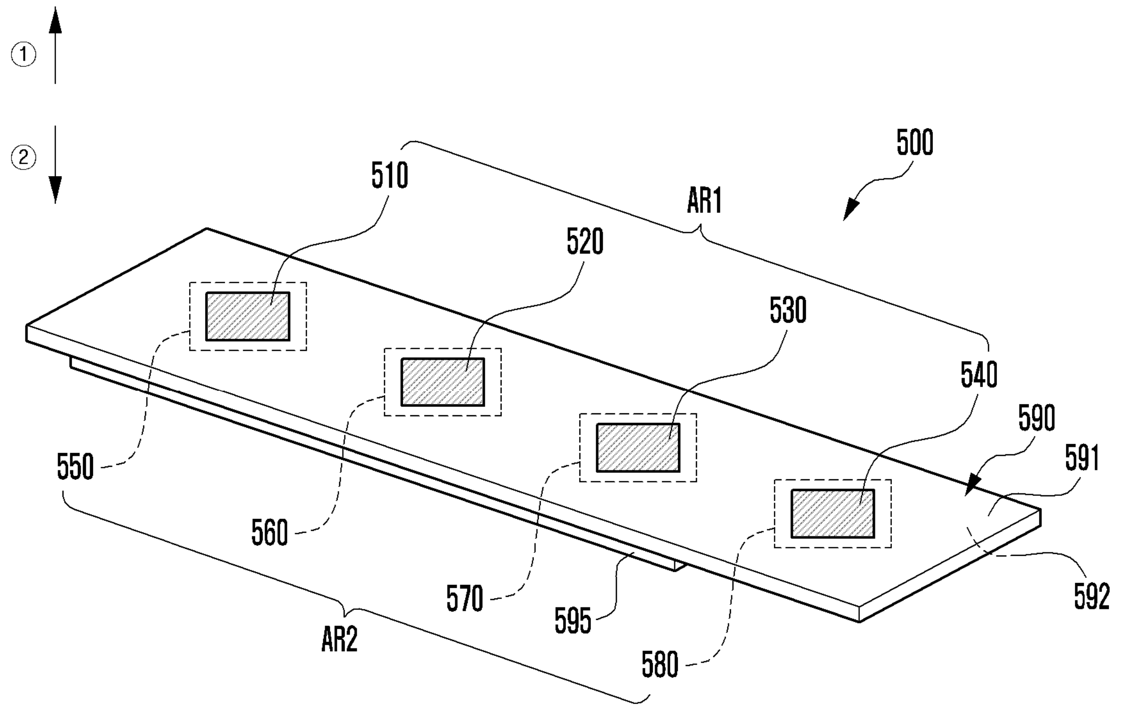
FIG. 5A is a perspective view illustrating an antenna module according to an embodiment of the disclosure.
Figure 5B:
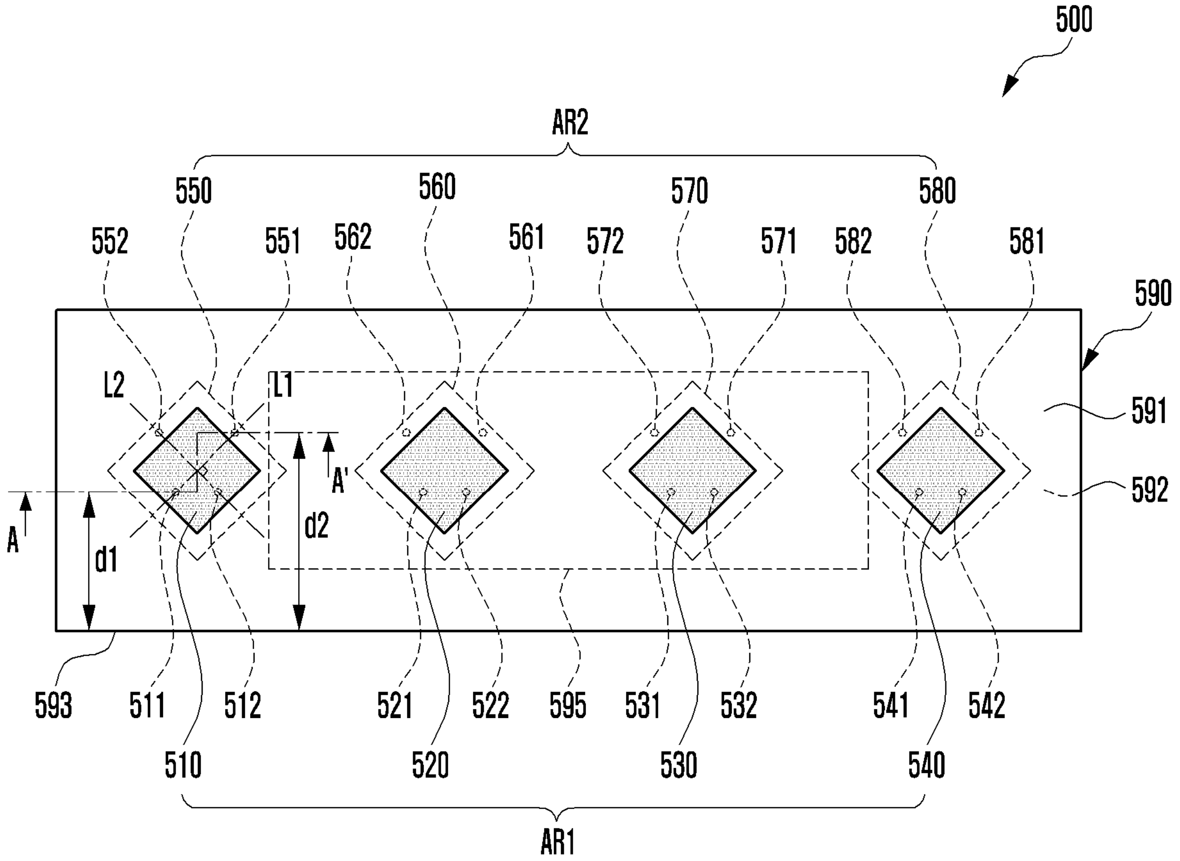
FIG. 5B is a plan view illustrating an antenna module according to an embodiment of the disclosure.

FIG. 5A is a perspective view illustrating an antenna module according to an embodiment of the disclosure. FIG. 5B is a plan view illustrating an antenna module 500 according to an embodiment of the disclosure.

The antenna module 500 of FIGS. 5A and 5B may be at least partially similar to the third antenna module 246 of FIG. 2 or may further include other components of the antenna module.

Referring to FIGS. 5A and 5B, the antenna module 500 may include a printed circuit board 590, a first antenna array AR1 including a plurality of first conductive patches 510, 520, 530, and 540 disposed at the printed circuit board 590, a second antenna array AR2 including a plurality of second conductive patches 550, 560, 570, and 580, and/or a wireless communication circuit 595 disposed at the printed circuit board 590 and electrically connected to the first antenna array AR1 and the second antenna array AR2.

The printed circuit board 590 may include a first surface 591 facing a first direction (① direction) and a second surface 592 facing a direction ② direction) opposite to that of the first surface 591. The first antenna array AR1 and the second antenna array AR2 may be disposed to form a beam pattern in the first direction ① direction). The wireless communication circuit 595 may be disposed at the second surface 592 of the printed circuit board 590. In another embodiment, the wireless communication circuit 595 may be disposed in an internal space of the electronic device spaced apart from the printed circuit board 590 and be electrically connected to the printed circuit board 590 through an electrical connection member. The plurality of first conductive patches 510, 520, 530, and 540 and the plurality of second conductive patches 550, 560, 570, and 580 may be electrically connected to the wireless communication circuit 595. The wireless communication circuit 595 may be configured to transmit and/or receive radio frequencies in the range of about 3 GHz to 100 GHz through the first antenna array AR1 and/or the second antenna array AR2. The wireless communication circuit 595 may be configured to transmit and/or receive a signal of a first frequency band (e.g., 39 GHz band) through the first antenna array AR1. The wireless communication circuit 595 may be configured to transmit and/or receive a signal in a second frequency band (e.g., 28 GHz band) lower than the first frequency band through the second antenna array AR2.

The plurality of first conductive patches 510, 520, 530, and 540 may include a first conductive patch 510, second conductive patch 520, third conductive patch 530, or fourth conductive patch 540 disposed at regular intervals at the first surface 591 of the printed circuit board 590 or in an area close to the first surface 591 inside the printed circuit board 590. The plurality of second conductive patches 550, 560, 570, and 580 may include a fifth conductive patch 550, sixth conductive patch 560, seventh conductive patch 570, or eighth conductive patch 580 at least partially overlapped with the plurality of first conductive patches 510, 520, 530, and 540, respectively, having the same center, and disposed under corresponding conductive patches, when viewed from above the first surface 591. According to one embodiment, the plurality of first conductive patches 510, 520, 530, and 540 and the plurality of second conductive patches 550, 560, 570, and 580 may be disposed in different insulation layers of the printed circuit board 590. The plurality of second conductive patches 550, 560, 570, and 580 may be disposed between the plurality of first conductive patches 510, 520, 530, and 540 and the second surface 592 of the printed circuit board 590. The plurality of first conductive patches 510, 520, 530, and 540 may be formed to have a smaller size than that of the plurality of second conductive patches 550, 560, 570, and 580.

The plurality of first conductive patches 510, 520, 530, and 540 may have substantially the same configuration. The plurality of second conductive patches 550, 560, 570, and 580 may have substantially the same configuration. Each of the plurality of first conductive patches 510, 520, 530, and 540 and each of the plurality of second conductive patches 550, 560, 570, and 580 corresponding thereto may have the same disposition structure. An embodiment of the disclosure illustrates and describes an antenna module 500 including a second antenna array AR2 including four second conductive patches 550, 560, 570, and 580 paired with a first antenna array AR1 including four first conductive patches 510, 520, 530, and 540, but it is not limited thereto. For example, the antenna module 500 may include one, two, three, or five or more first conductive patches as the first antenna array AR1 and include one, two, three or five or more second conductive patches paired with the plurality of first conductive patches as the second antenna array AR2.

The antenna module 500 may operate as a dual polarized antenna in a first frequency band through feeding points 511, 512, 521, 522, 531, 532, 541, and 542 disposed in each of the plurality of first conductive patches 510, 520, 530, and 540. The antenna module 500 may operate as a dual polarized antenna in a second frequency band through feeding points 551, 552, 561, 562, 571, 572, 581, and 582 disposed in each of the plurality of second conductive patches 550, 560, 570, and 580. The plurality of first conductive patches 510, 520, 530, and 540 and the plurality of second conductive patches 550, 560, 570, and 580 may be formed in a shape having a vertical and lateral symmetrical structure in order to form a dual polarized antenna. For example, the plurality of first conductive patches 510, 520, 530, and 540 and the plurality of second conductive patches 550, 560, 570, and 580 may be formed in a square, circular, or octagonal shape.

The first conductive patch 510 may include a first feeding point 511 and/or a second feeding point 512. The second conductive patch 520 may include a third feeding point 521 and/or a fourth feeding point 522. The third conductive patch 530 may include a fifth feeding point 531 and/or a sixth feeding point 532. The fourth conductive patch 540 may include a seventh feeding point 541 and/or an eighth feeding point 542. The wireless communication circuit 595 may be configured to transmit and/or receive a first signal having first polarization through the first feeding point 511, the third feeding point 521, the fifth feeding point 531, and/or the seventh feeding point 541 in a first frequency band. The wireless communication circuit 595 may be configured to transmit and/or receive a second signal having second polarization through the second feeding point 512, the fourth feeding point 522, the sixth feeding point 532, and/or the eighth feeding point 542 in the first frequency band. The wireless communication circuit 595 may transmit and/or receive a first signal and/or a second signal that are/is the same as or different from each other in the first frequency band.

The fifth conductive patch 550 may include a ninth feeding point 551 and/or a tenth feeding point 552. The sixth conductive patch 560 may include an eleventh feeding point 561 and/or a twelfth feeding point 562. The seventh conductive patch 570 may include a thirteenth feeding point 571 and/or a fourteenth feeding point 572. The eighth conductive patch 580 may include a fifteenth feeding point 581 and/or a sixteenth feeding point 582. The wireless communication circuit 595 may be configured to transmit and/or receive a third signal having third polarization equal to first polarization through the ninth feeding point 551, the eleventh feeding point 561, the thirteenth feeding point 571, and/or the fifteenth feeding point 581 in a second frequency band. The wireless communication circuit 595 may be configured to transmit and/or receive a fourth signal having fourth polarization equal to second polarization through the tenth feeding point 552, the twelfth feeding point 562, the fourteenth feeding point 572, and/or the sixteenth feeding point 582 in a second frequency band. The wireless communication circuit 595 may transmit and/or receive a third signal and/or a fourth signal that are/is the same as or different from each other in the second frequency band.

When describing with reference to FIG. 5B, the antenna module 500 operating with dual band dual polarization based on the disposition relationship of the first conductive patch 510 having the first feeding point 511 and/or the second feeding point 512 and the fifth conductive patch 550 having the ninth feeding point 551 and/or the tenth feeding point 552 is described, but the disposition relationship of the remaining plurality of first conductive patches 520, 530, and 540 and the remaining plurality of second conductive patches 560, 570, and 580 may also have substantially the same configuration.

Referring to FIG. 5B, the antenna module 500 may include a printed circuit board 590, a plurality of first conductive patches 510, 520, 530, and 540 disposed at a first surface 591 of the printed circuit board 590 or inside the printed circuit board 590 close to the first surface 591, and having the same center as that of the plurality of first conductive patches 510, 520, 530, and 540, when viewed from above the first surface 591, and a plurality of second conductive patches 550, 560, 570, and 580 disposed inside the printed circuit board 590 farther from the first surface 591 than the plurality of first conductive patches 510, 520, 530, and 540. The printed circuit board 590 may include a first side 593 The first side 593 may include a side disposed closer to a conductive portion (e.g., the conductive portion 821 of FIG. 8) of a side member (e.g., the side member 820 of FIG. 8) of an electronic device (e.g., the electronic device 800 of FIG. 8) to be described later among the relatively long sides of the rectangular printed circuit board 590.

The first conductive patch 510 may include a first feeding point 511 for transmitting and/or receiving a first signal and/or a second feeding point 512 for transmitting and/or receiving a second signal. The first feeding point 511 and/or the second feeding point 512 may be disposed to exhibit substantially different polarization characteristics in the first frequency band. The first feeding point 511 may be disposed on a first imaginary line L1 passing through the center of the first conductive patch 510. The second feeding point 512 may pass through the center of the first conductive patch 510 and be rotated by substantially 90° with respect to the first imaginary line L1 to be disposed on a second imaginary line L2 vertically intersecting the first imaginary line L1.

The fifth conductive patch 550 may include a ninth feeding point 551 for transmitting and/or receiving a third signal and/or a tenth feeding point 552 for transmitting and/or receiving a fourth signal. The ninth feeding point 551 and the tenth feeding point 552 may be disposed to exhibit substantially different polarization characteristics in the second frequency band. The ninth feeding point 551 may exhibit the same polarization characteristic as that of the first feeding point 511. The tenth feeding point 552 may exhibit the same polarization characteristic as that of the second feeding point 512. The ninth feeding point 551 may be disposed on the first imaginary line L1. The tenth feeding point 552 may be disposed on the second imaginary line L2.

When a conductive portion (e.g., the conductive portion 821 of FIG. 8) is disposed around the antenna module, radiation efficiency in the first frequency band and/or the second frequency band may be reduced according to a disposition position of the feeding points 511, 512, 551, and 552. Accordingly, when two conductive patches 510 and 550 are overlapped at least partially and are used as a dual band dual polarized antenna, in order to secure a radiation performance, the feeding points 511, 512, 551, and 552 may be disposed in consideration of the conductive portion.

Figure 8:
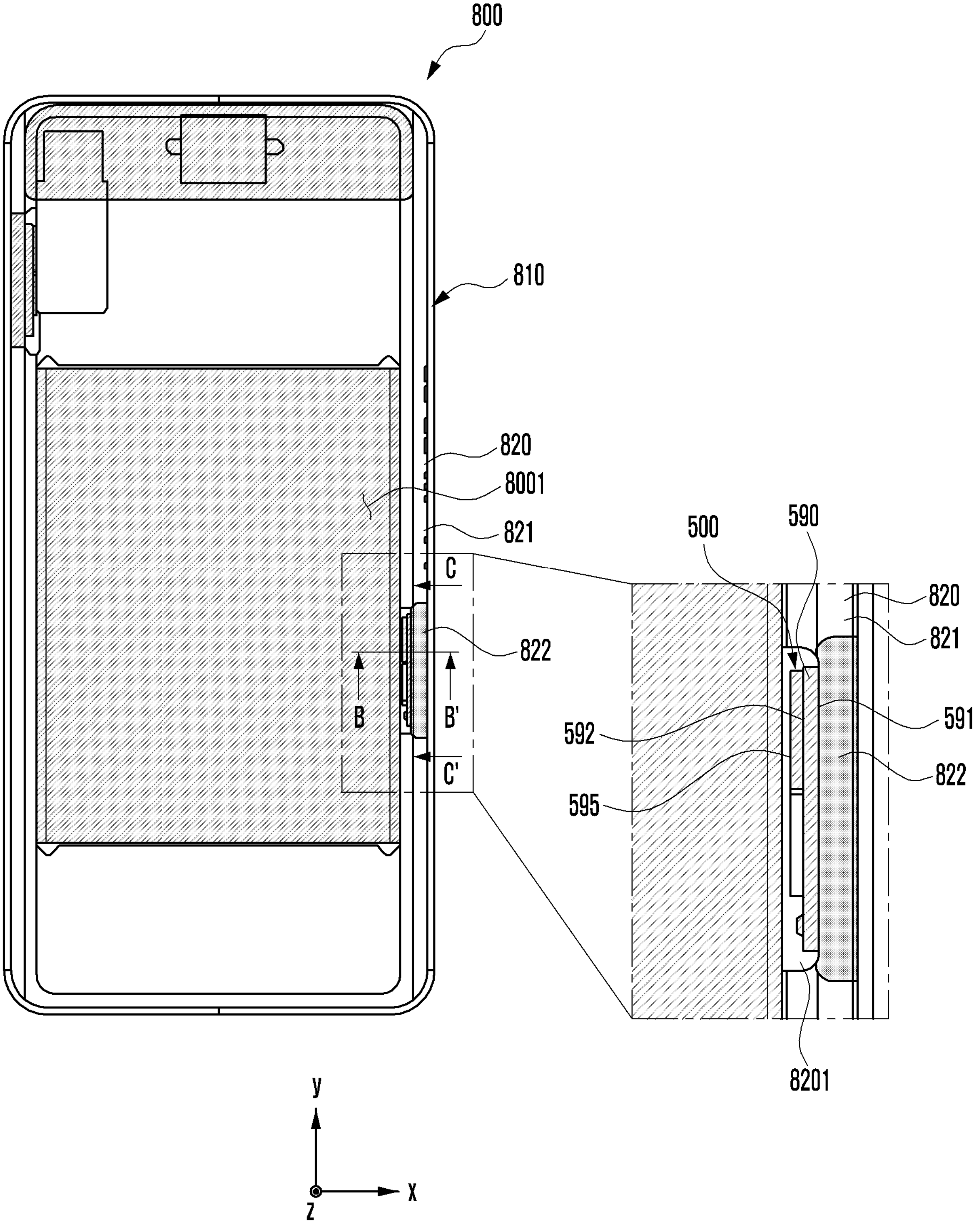
FIG. 8 is a diagram illustrating a state in which an antenna module is mounted in an electronic device according to an embodiment of the disclosure.

The printed circuit board 590 may include a first side 593 (e.g., first long side) positioned parallel with a disposition direction of the conductive patches 510, 520, 530, 540, 550, 560, 570, and 580, and disposed close to a conductive member (e.g., a conductive portion 821 of FIG. 8). The first feeding point 511 and/or the second feeding point 512 disposed at the first conductive patch 510 may be disposed to have substantially the same first vertical distance d1 from the first side 593 of the printed circuit board 590. The ninth feeding point 551 and/or the tenth feeding point 552 disposed at the fifth conductive patch 550 may be disposed to have substantially the same second vertical distance d2 from the first side 593 of the printed circuit board 590. The first vertical distance d1 between two feeding points 511 and 512 of the first conductive patch 510 operating in the first frequency band and the first side 593 may be smaller than the second vertical distance d2 between two feeding points 551 and 552 and the first side 593 of the fifth conductive patch 550 operating in the second frequency band lower than the first frequency band. Therefore, even if the feeding points 511 and 512 of the conductive patch 510 operating in a relatively higher frequency band (e.g., first frequency band) are close to the conductive portions (e.g., the conductive portion 821 of FIG. 8) of the electronic device, the change in radiation performance may be small.

Figure 6:
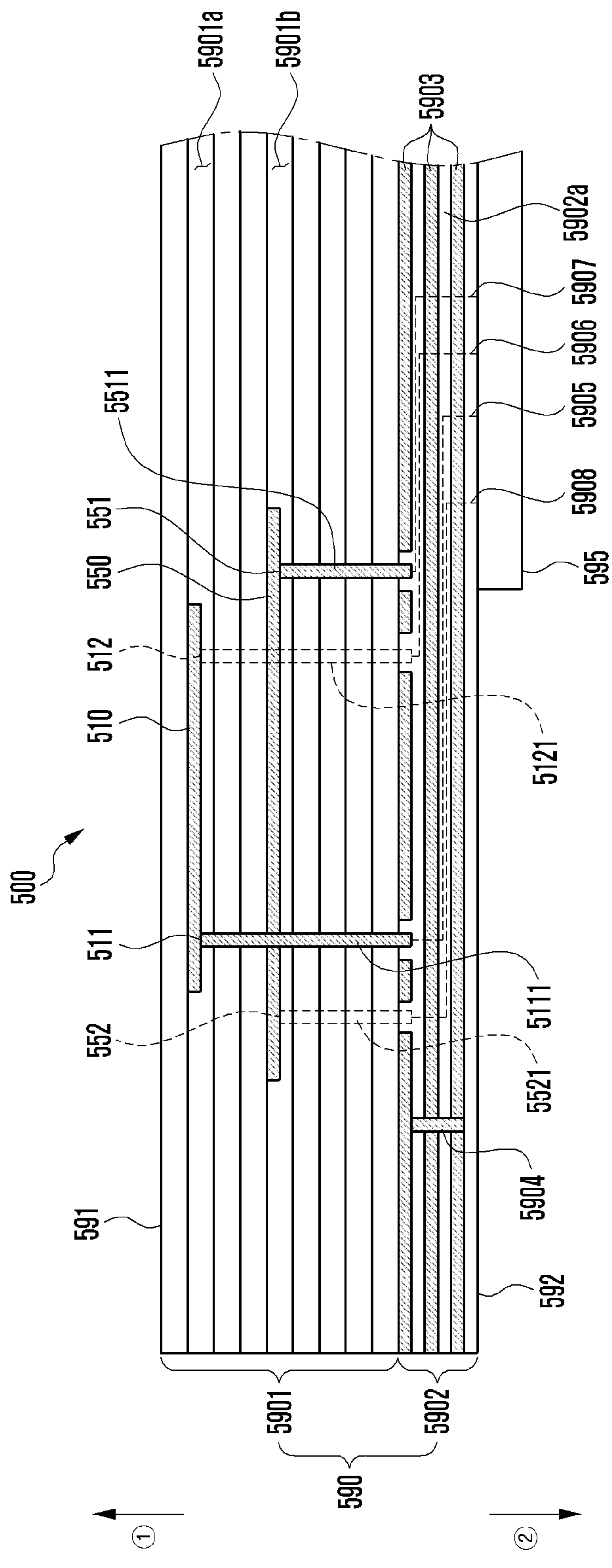
FIG. 6 is a cross-sectional view illustrating an antenna module taken along line A-A' of FIG. 5B according to an embodiment of the disclosure.

FIG. 6 is a cross-sectional view illustrating an antenna module 500 taken along line A-A' of FIG. 5B according to an embodiment of the disclosure.

Referring to FIG. 6, a disposition configuration of the first conductive patch 510 disposed at the printed circuit board 590 of the antenna module 500 and the fifth conductive patch 550 corresponding thereto is illustrated and described, but a second conductive patch (e.g., the second conductive patch 520 of FIG. 5A) and a sixth conductive patch (e.g., the sixth conductive patch 560 of FIG. 5A) corresponding thereto, a third conductive patch (e.g., the third conductive patch 530 of FIG. 5A) and a seventh conductive patch (e.g., the seventh conductive patch 570 of FIG. 5A) corresponding thereto, and/or a fourth conductive patch (e.g., the fourth conductive patch 540 of FIG. 5A) and an eighth conductive patch (e.g., the eighth conductive patch 580 of FIG. 5A) corresponding thereto may have substantially the same configuration.

Referring to FIG. 6, the antenna module 500 may include an antenna structure including a printed circuit board 590 and a first conductive patch 510 and a fifth conductive patch 550 having the same center in the printed circuit board 590 and disposed at different insulating layers. The printed circuit board 590 may include a first surface 591 facing a first direction (1) direction) and a second surface 592 facing a direction ((2) direction) opposite to that of the first surface 591. The printed circuit board 590 may include a plurality of insulating layers. The printed circuit board 590 may include a first layer area 5901 including at least one insulating layer and/or a second layer area 5902 adjacent to the first layer area 5901 and including another at least one insulating layer. The antenna module 500 may include a first conductive patch 510 disposed in a first insulating layer 5901*a* of the first layer area 5901. The antenna module 500 may include a fifth conductive patch 550 disposed in a second insulating layer 5901*b* farther than the first insulating layer 5901*a* from the first surface 591 of the first layer area 5901. The antenna module 500 may include at least one ground layer 5903 disposed in at least one third insulating layer 5402*a* of the second layer area 5902. At least one ground layer 5903 may be electrically connected to each other through at least one conductive via 5904 in the second layer area 5902. In another embodiment of the disclosure, the antenna module 500 may include another ground layer disposed to be insulated from the first conductive patch 510 and the fifth conductive patch 550 in the first layer area 5901.

The first conductive patch 510 may be disposed at the first insulating layer 5901*a* closer to the first surface 591 than the second surface 592 in the first layer area 5901. The first conductive patch 510 may be disposed to be exposed to the first surface 591 inside the first layer area 5901. The fifth conductive patch 550 may be disposed at the second insulating layer 5901*b* farther than the first conductive patch 510 from the first surface 591 in the first layer area 5901. The fifth conductive patch 550 may be disposed in the second insulating layer 5901*b* of the first layer area 5901. When viewed from above the first surface 591, the first conductive patch 510 may be disposed to have the same center as that of the fifth conductive patch 550 and to at least partially overlap with the first conductive patch 510. When viewed from above the first surface 591, the first conductive patch 510 may be disposed to have a smaller size than that of the fifth conductive patch 550 and/or the same shape as that of the fifth conductive patch 550. The first conductive patch 510 may include a first feeding point 511 disposed through a first feeding portion 5111 disposed to penetrate at least a first layer area 5901 in a vertical direction and/or a second feeding point 512 disposed through a second feeding portion 5121. The first feeding portion 5111 and the second feeding portion 5121 may include conductive vias for penetrating the first layer area 5101 and physically contacting the first conductive patch 510 to form the feeding points 511 and 512. The first feeding portion 5111 may be electrically connected to the wireless communication circuit 595 through a first feeding line 5905 disposed in the second layer area 5902. The second feeding point 512 may be electrically connected to the wireless communication circuit 595 through a second feeding line 5906 disposed in the second layer area 5902. The first feeding line 5905 and/or the second feeding line 5906 may be disposed to be electrically disconnected from at least one ground layer 5903 disposed in a third insulating layer 5902*a* of the second layer area 5902.

The fifth conductive patch 550 may include a ninth feeding point 551 disposed through a ninth feeding portion 5511 disposed to penetrate at least a first layer area 5901 in a vertical direction and/or a tenth feeding point 552 disposed through a tenth feeding portion 5521. The ninth feeding portion 5511 and/or the tenth feeding portion 5501 may include conductive vias for penetrating the first layer area 5901 and physically contacting the fifth conductive patch 550 to form the feeding points 551 and 552. The ninth feeding portion 5511 may be electrically connected to the wireless communication circuit 595 through a third feeding line 5907 disposed in the second layer area 5902. The tenth feeding portion 5251 may be electrically connected to the wireless communication circuit 595 through a fourth feeding line 5908 disposed in the second layer area 5902. The third feeding line 5907 and/or the fourth feeding line 5908 may be disposed to be electrically disconnected from at least one ground layer 5903 disposed in the third insulating layer 5902*a* of the second layer area 5902.

Figure 7A:
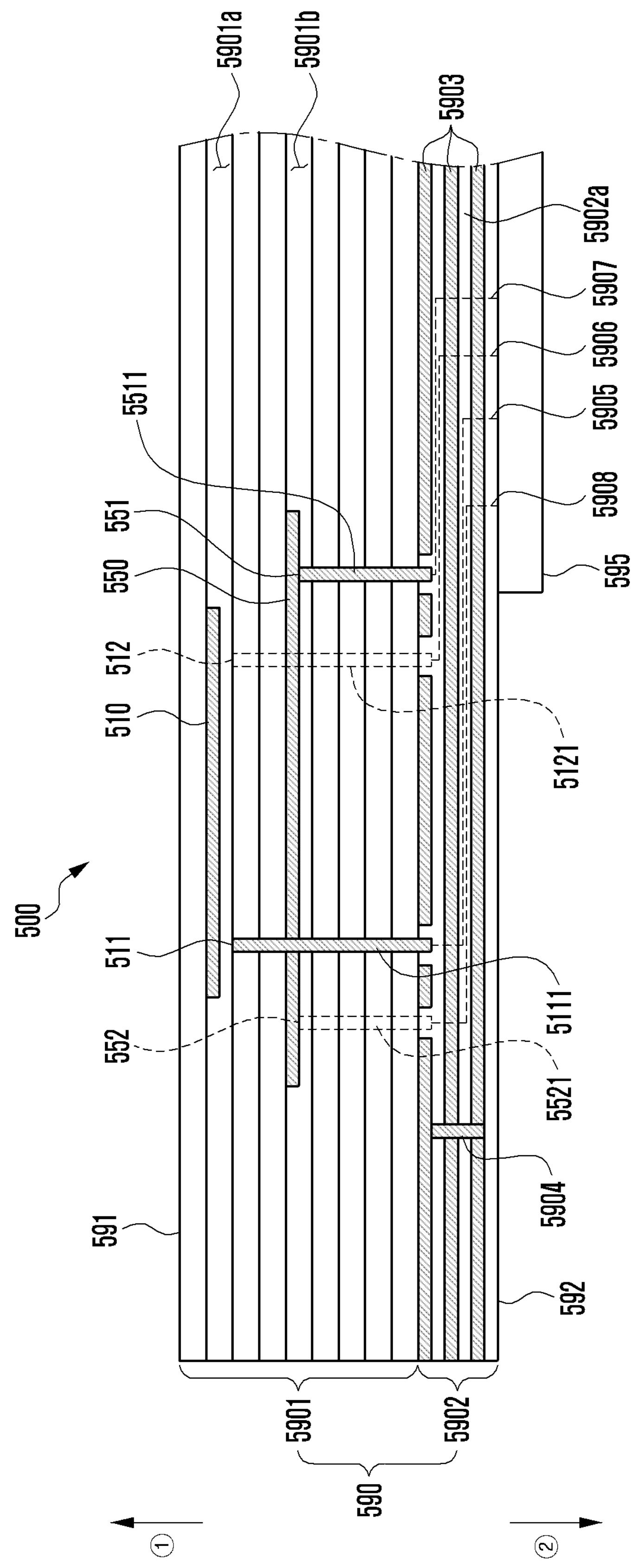
FIGS. 7A, 7B, and 7C are partial cross-sectional views illustrating an antenna module according to various embodiments of the disclosure.
Figure 7B:
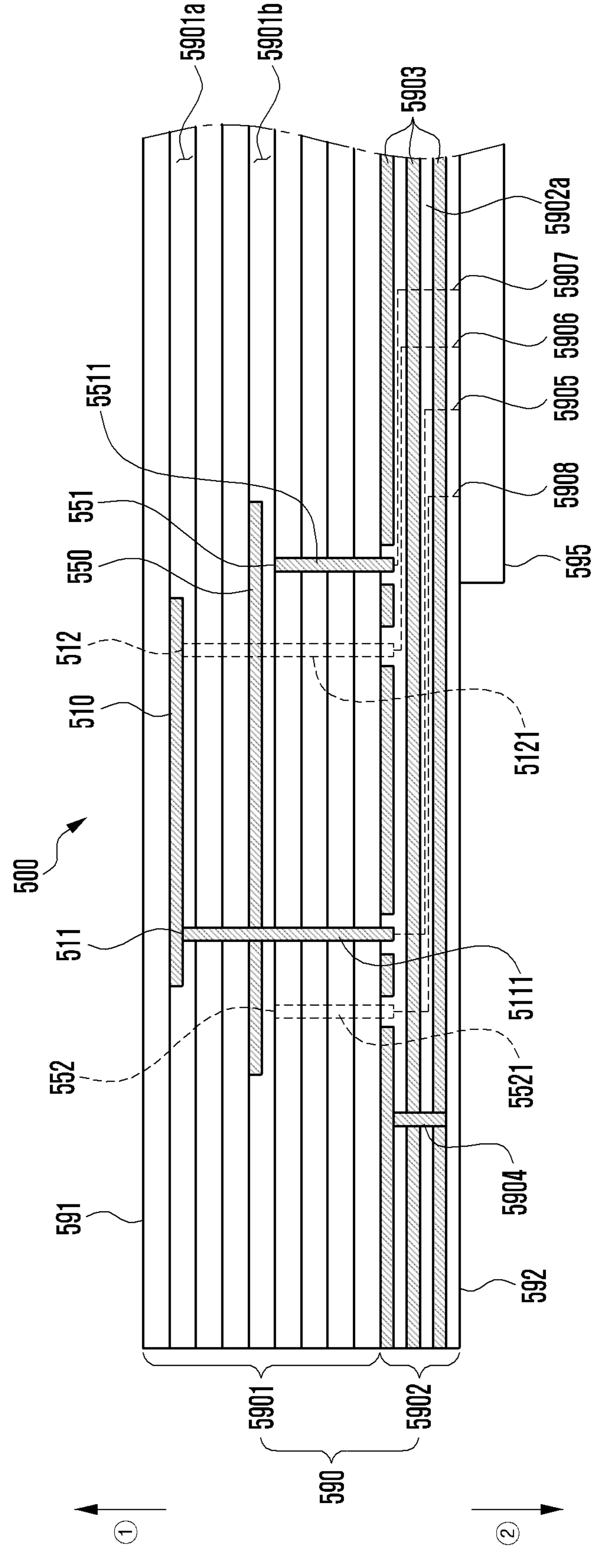
Figure 7C:
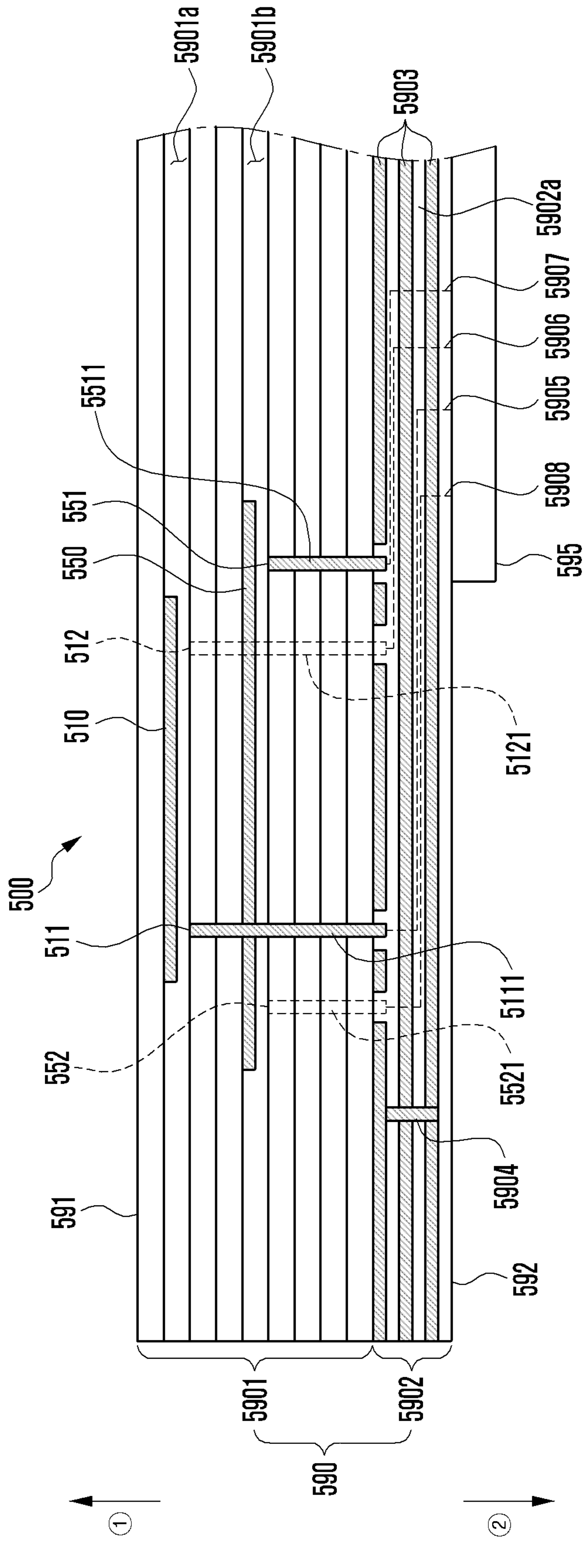

FIGS. 7A to 7C are partial cross-sectional views illustrating an antenna module 500 according to various embodiments of the disclosure.

Reference to FIGS. 7A to 7C, the same reference numerals are used to substantially the same elements as those of FIG. 6, and a detailed description thereof may be omitted.

As described above, a direct feeding structure of the first feeding point 511, the second feeding point 512, the ninth feeding point 551, and/or the tenth feeding point 552 through the first feeding portion 5111, the second feeding portion 5121, the ninth feeding portion 5511, and the tenth feeding portion 5521 in physical contact with the first conductive patch 510 and/or the fifth conductive patches 550 was described, but according to embodiments of the disclosure, at least one feeding point of the first feeding point 511, the second feeding point 512, the ninth feeding point 551, or the tenth feeding point 552 may be electrically connected to the conductive patch in a capacitively coupled manner through the feeding portion.

Referring to FIG. 7A, the first conductive patch 510 may be electrically connected to the first feeding point 511 through the first feeding portion 5111 disposed to be capacitively coupled to the first conductive patch 510 in the first layer area 5901. The first conductive patch 510 may be electrically connected to the second feeding point 512 through the second feeding portion 5121 disposed to be capacitively coupled to the first conductive patch 510 in the first layer area 5901.

Referring to FIG. 7B, the fifth conductive patch 550 may be electrically connected to the ninth feeding point 551 through the ninth feeding portion 5511 disposed to be capacitively coupled with the fifth conductive patch 550 in the first layer area 5901. The fifth conductive patch 550 may be electrically connected to the tenth feeding point 552 through the tenth feeding portion 5521 disposed to be capacitively coupled with the fifth conductive patch 550 in the first layer area 5901.

Referring to FIG. 7C, each of the first feeding point 511 and the second feeding point 512 of the first conductive patch 510, and the ninth feeding point 551 and the tenth feeding point 552 of the fifth conductive patch 550 may be electrically connected to be capacitively coupled to each of the conductive patches 510 and 550 through the first feeding portion 5111, the second feeding portion 5121, the ninth feeding portion 5511, and the tenth feeding portion 5521.

Conductive pads connected to each of the feeding portion 5111, 5121, 5511, and 5521 and disposed to be capacitively coupled to each of the conductive patches 510 and 520 and having a predetermined coupling area may be further disposed between each of the feeding points 511, 512, 551, and 552 and each of the conductive patches 510 and 550.

FIG. 8 is a diagram illustrating a state in which an antenna module 500 is mounted in an electronic device 800 according to an embodiment of the disclosure.

The electronic device 800 of FIG. 8 may be at least partially similar to the electronic device 101 of FIG. 1 or the electronic device 300 of FIG. 3A or may further include other embodiments of the electronic device.

Referring to FIG. 8, the electronic device 800 may include a housing 810 including a front plate (e.g., a front plate 830 of FIG. 9A) facing a first direction (e.g., −Z direction of FIG. 9A), a rear plate (e.g., a rear plate 840 of FIG. 9A) facing a direction (e.g., Z direction of FIG. 9A) opposite to that of the front plate 830, and a side member 820 enclosing a space 8001 between the front plate 830 and the rear plate 840. The side member 820 may include a conductive portion 821 at least partially disposed and a polymer portion 822 (e.g., non-conductive portion) insert injected into the conductive portion 821. The polymer portion 822 may be replaced with space or other dielectric material. The polymer portion 822 may be structurally coupled to the conductive portion 821.

Figure 9A:
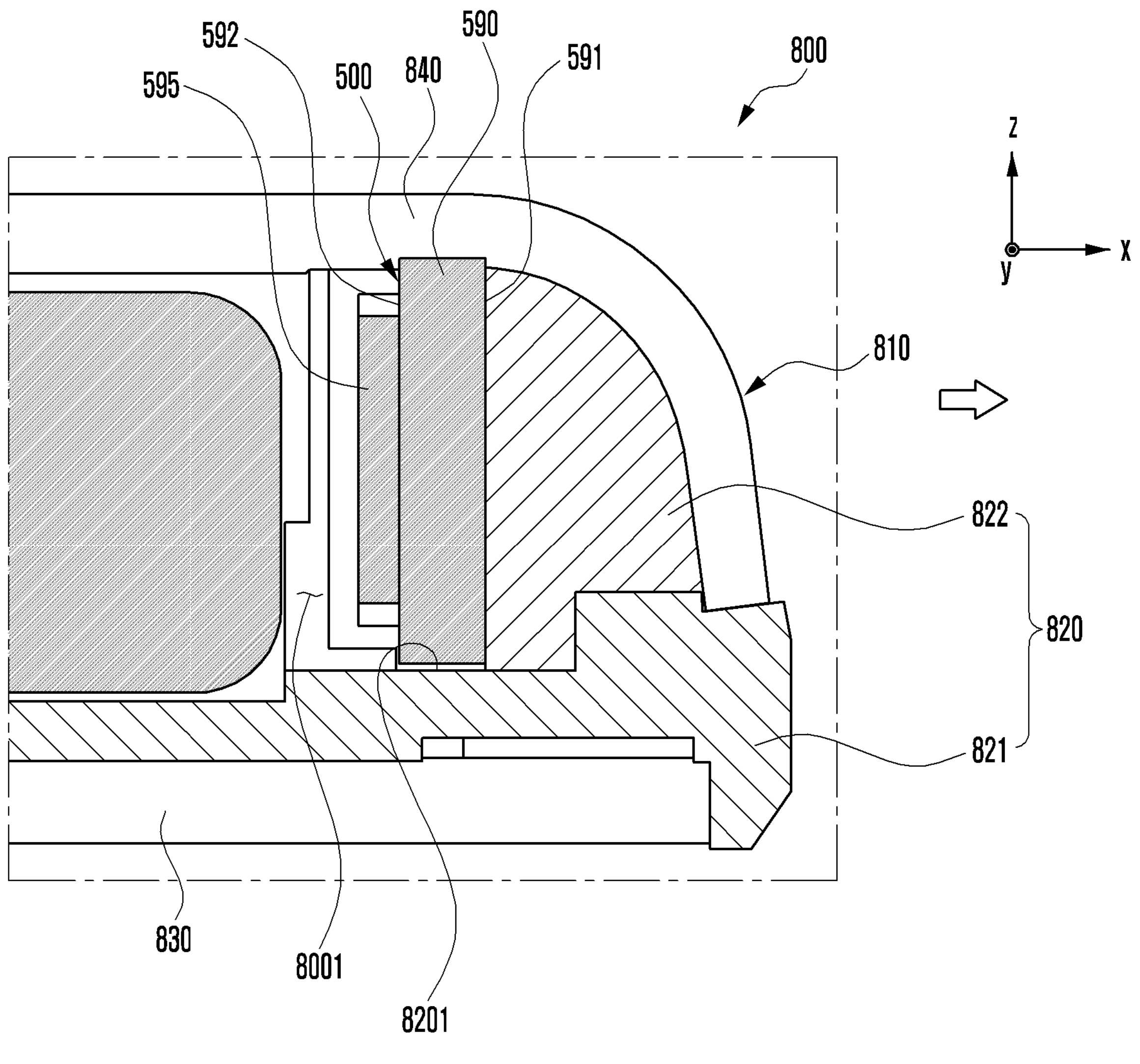
FIG. 9A is a partial cross-sectional view illustrating an electronic device taken along line B-B' of FIG. 8 according to an embodiment of the disclosure.
Figure 9B:
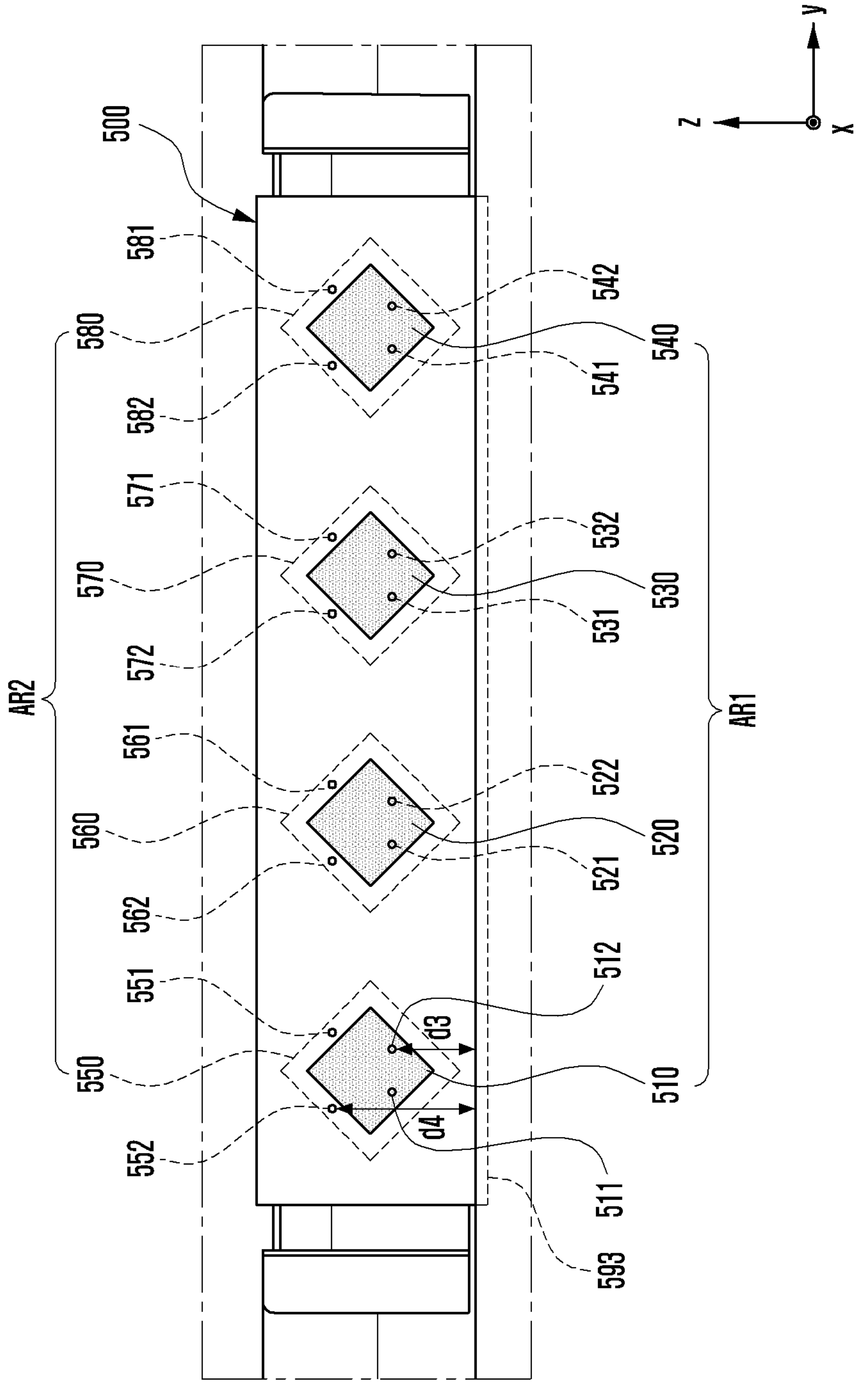
FIG. 9B is a partial cross-sectional view illustrating an electronic device taken along line C-C' of FIG. 8 according to an embodiment of the disclosure.

The antenna module 500 may be mounted in the internal space 8001 of the electronic device 800 so that conductive patches (e.g., conductive patches 510, 520, 530, 540, 550, 560, 570, and 580 of FIG. 9B) face the side member 820. For example, the antenna module 500 may be mounted in a module mounting portion 8201 provided in the side member 820 such that the first surface 591 of the printed circuit board 590 faces the side member 820. In at least a partial area of the side member 820 facing the antenna module 500, the polymer portion 822 may be disposed to form a beam pattern in a direction (X axis direction) facing the first surface 591 of the printed circuit board 590.

FIG. 9A is a partial cross-sectional view illustrating an electronic device taken along line B-B' of FIG. 8 according to an embodiment of the disclosure. FIG. 9B is a partial cross-sectional view illustrating an electronic device 800 taken along line C-C' of FIG. 8 according to embodiment of the disclosure. FIG. 9B illustrates the antenna module 500 disposed visibly from the outside of the side member 820 with the polymer portion 822 omitted according to embodiment of the disclosure.

Referring to FIGS. 9A and 9B, the printed circuit board 590 of the antenna module 500 may be mounted in the module mounting portion 8201 of the side member 820 so as to include an area at least partially overlapped with the conductive portion 821 when the side member 820 is viewed from the outside. Through a mounting structure using the module mounting portion 8201, a thickness of the electronic device 800 according to mounting of the printed circuit board 590 can be reduced, and the printed circuit board 590 can be firmly mounted in the side member 820.

When the side member 820 is viewed from the outside, at least some areas of the printed circuit board 590 may be disposed to overlap the conductive portion 821. The first side 593 of the printed circuit board 590 may be disposed closest to the conductive portion 821 of the side member 820. When the side member 820 is viewed from the outside, the conductive patches 510, 520, 530, 540, 550, 560, 570, and 580 of the antenna module 500 may be disposed not to overlap with the conductive portion 821. In another embodiment of the disclosure, when the side member 820 is viewed from the outside, the conductive patches 510, 520, 530, 540, 550, 560, 570, and 580 of the antenna module 500 may be disposed to at least partially overlap the conductive portion 821. In this case, when the side member 820 is viewed from the outside, the feeding points 511, 512, 521, 522, 531, 532, 541, 542, 551, 552, 561, 562, 571, 572, 581, and 582 may be disposed at a position not overlapping with the conductive portion 821.

The printed circuit board 590 may include a first side 593 (e.g., first long side) positioned parallel to a disposition direction of the conductive patches 510, 520, 530, 540, 550, 560, 570, and 580 and disposed adjacent to the conductive portion (e.g., the conductive member 821 of FIG. 8). The feeding points 511, 512, 521, 522, 531, 532, 541, and 542 disposed in the plurality of first conductive patches 510, 520, 530, and 540 may be disposed to have the same first vertical distance d1 from the first side 593 of the printed circuit board 590 disposed closest to the conductive portion 821. The feeding points 551, 552, 561, 562, 571, 572, 581, and 582 disposed in the plurality of second conductive patches 550, 560, 570, and 580 may be disposed to have the same second vertical distance d2 from the first side 593 of the printed circuit board 590 disposed closest to the conductive portion 821. A first vertical distance d1 between the feeding points 511, 512, 521, 522, 531, 532, 541, and 542 of the first conductive patches 510, 520, 530, and 540 operating in the first frequency band and the first side 593 may be smaller than a second vertical distance d2 between the feeding points 551, 552, 561, 562, 571, 572, 581, and 582 of the plurality of second conductive patches 550, 560, 570, and 580 operating in a second frequency band lower than the first frequency band and the first side 593.

In another embodiment of the disclosure, the feeding points 511, 512, 521, 522, 531, 532, 541, and 542 disposed at the plurality of first conductive patches 510, 520, 530, and 540 may be disposed to have substantially the same third vertical distance d3 from the conductive portion 821. The feeding points 551, 552, 561, 562, 571, 572, 581, and 582 disposed at the plurality of second conductive patches 550, 560, 570, and 580 may be disposed to have substantially the same fourth vertical distance d4 from the conductive portion 821. The third vertical distance d3 may be smaller or larger than the first vertical distance d1. The fourth vertical distance d4 may be smaller or larger than the second vertical distance d2. The third vertical distance d3 between the conductive portion 821 and the feeding points 511, 512, 521, 522, 531, 532, 541, and 542 of the first conductive patches 510, 520, 530, and 540 operating in the first frequency band and the conductive portion 821 may be smaller than the fourth vertical distance d4 between the conductive portion 821 and the feeding points 551, 552, 561, 562, 571, 572, 581, and 582 of the plurality of second conductive patches 550, 560, 570, and 580 operating in the second frequency band lower than the first frequency band. This is because the conductive patches 510, 520, 530, and 540 operating in a relatively higher frequency band (e.g., first frequency band) respond insensitive to changes in radiation performance even when the conductive patches 510, 520, 530, and 540 are close to the conductive portion 821 of the electronic device 800.

Figure 10A:
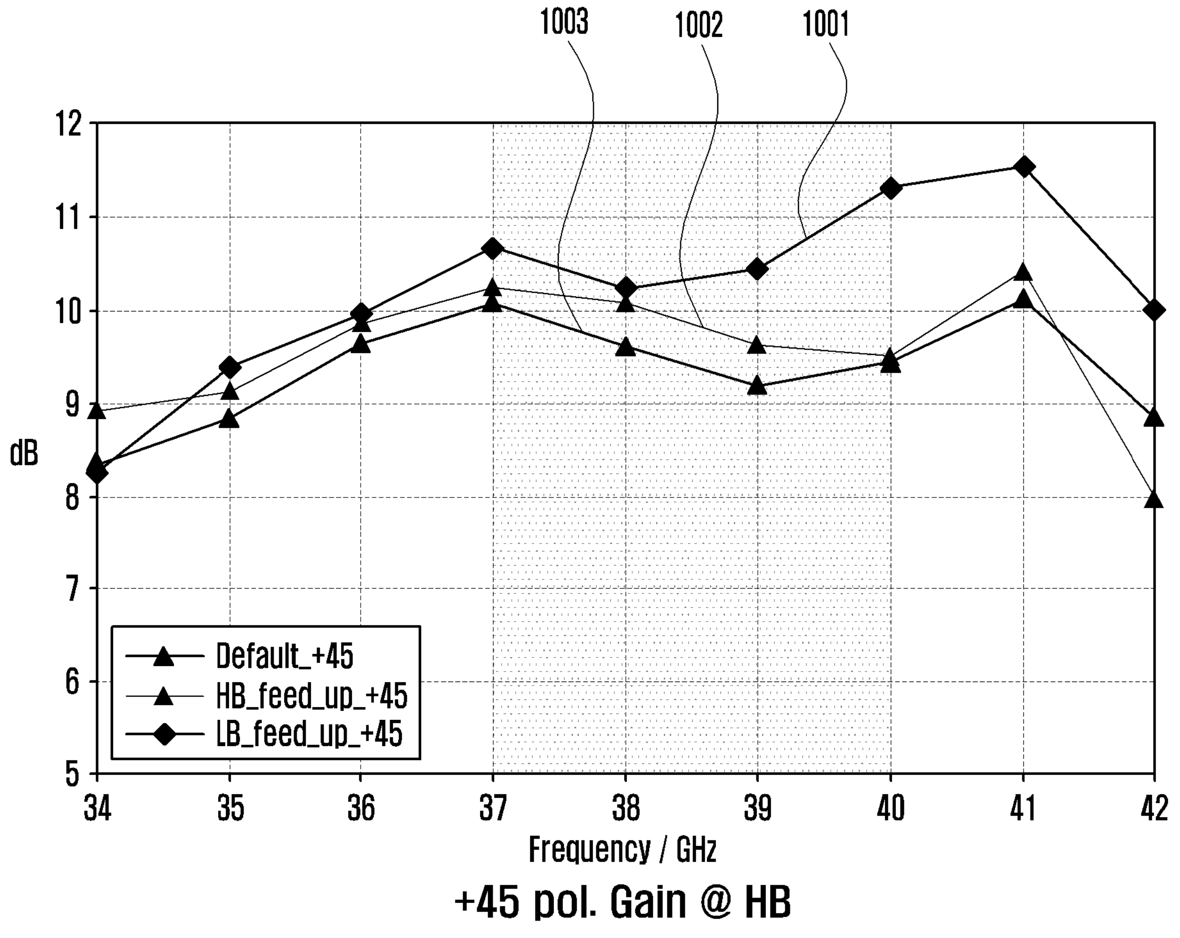
FIGS. 10A and 10B are graphs illustrating a peak gain performance of dual polarization in a first frequency band according to various embodiments of the disclosure.
Figure 10B:
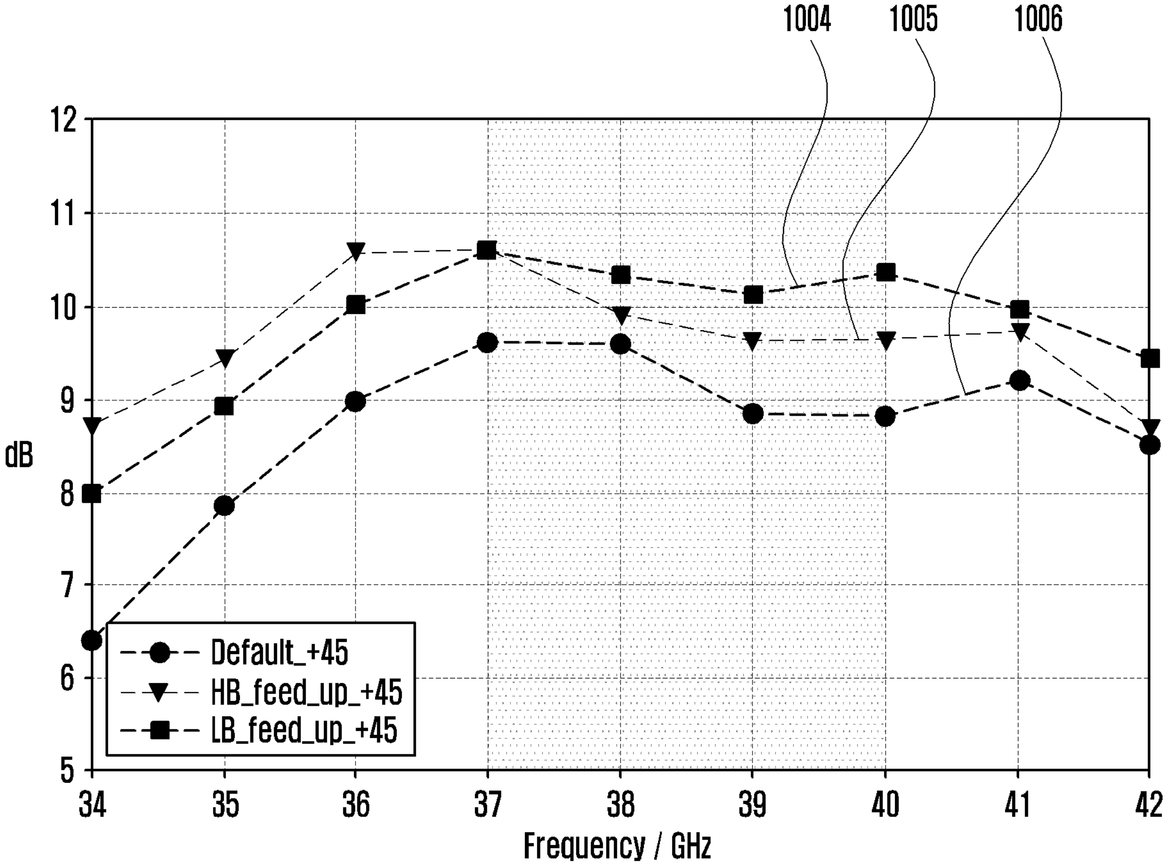

FIGS. 10A and 10B are graphs illustrating a peak gain performance of dual polarization in a first frequency band according to various embodiments of the disclosure.

Referring to FIGS. 9B to 10B, when describing a peak gain of dual polarization vertically exhibited in the first frequency band (e.g., 37 GHz to 40 GHZ) of the antenna module 500, it can be seen that peak gains (LB_feed_up±45) 1001 and 1004 of a case in which the feeding points 511, 512, 521, 522, 531, 532, 541, and 542 of the plurality of first conductive patches 510, 520, 530, and 540 are disposed closer to the conductive portion 821 than the feeding points 551, 552, 561, 562, 571, 572, 581, and 582 of the plurality of second conductive patches 550, 560, 570, and 580 is superior to peak gains (HB_feed_up±45) 1002 and 1005 of a case in which the feeding points 511, 512, 521, 522, 531, 532, 541, and 542 of the plurality of first conductive patches 510, 520, 530, and 540 are disposed farther from the conductive portion 821 than the feeding points 551, 552, 561, 562, 571, 572, 581, and 582 of the plurality of second conductive patches 550, 560, 570, and 580 or peak gains (Default±45) 1003 and 1006 of a case in which the feeding points 511, 512, 521, 522, 531, 532, 541, and 542 of the plurality of first conductive patches 510, 520, 530, and 540 are mixed with the feeding points 551, 552, 561, 562, 571, 572, 581, and 582 of the plurality of second conductive patches 550, 560, 570, and 580 to be disposed close to the conductive portion 821.

Figure 11A:
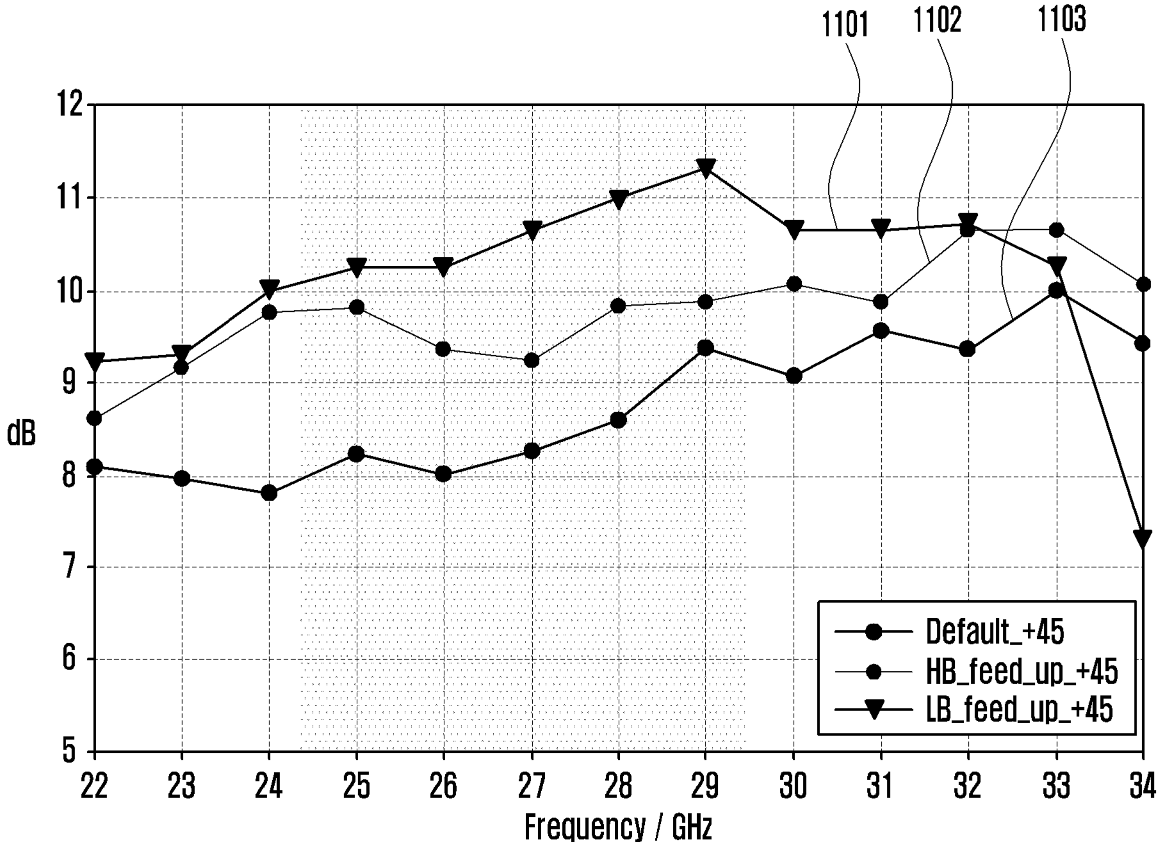
FIGS. 11A and 11B are graphs illustrating a peak gain performance of dual polarization in a second frequency band according to various embodiments of the disclosure.
Figure 11B:
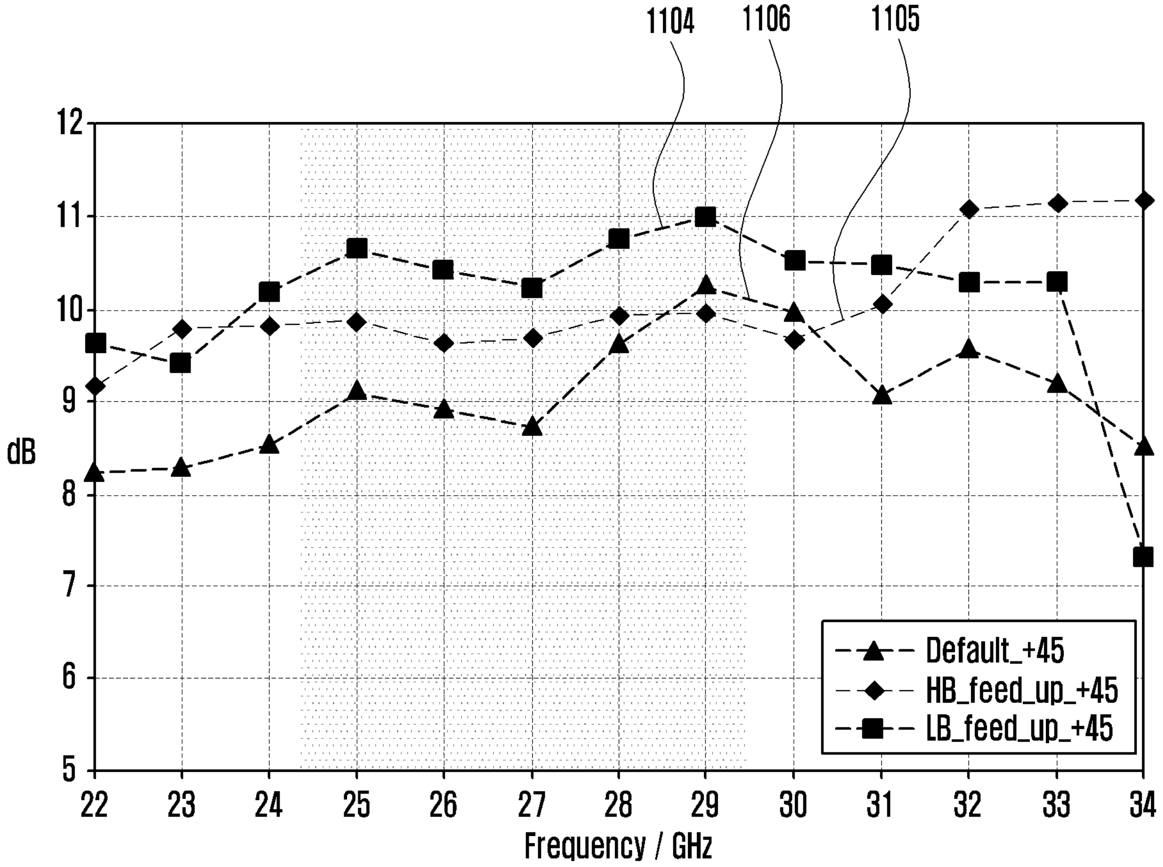

FIGS. 11A and 11B are graphs illustrating a peak gain performance of dual polarization in a second frequency band according to various embodiments of the disclosure.

Referring to FIGS. 9B, 11A, and 11B, when describing a peak gain of dual polarization vertically exhibited in a second frequency band (e.g., 24.5 GHz to 29.5 GHz) of the antenna module 500, it can be seen that peak gains (LB-_feed_up±45) 1101 and 1104 of a case in which feeding points 511, 512, 521, 522, 531, 532, 541, and 542 of the plurality of first conductive patches 510, 520, 530, and 540 are disposed closer to the conductive portion 821 than the feeding points 551, 552, 561, 562, 571, 572, 581, and 582 of the plurality of second conductive patches 550, 560, 570, and 580 is superior to peak gains (HB_feed_up±45) 1102 and 1105 of a case in which the feeding points 511, 512, 521, 522, 531, 532, 541, and 542 of the plurality of first conductive patches 510, 520, 530, and 540 are disposed farther from the conductive portion 821 than the feeding points 551, 552, 561, 562, 571, 572, 581, and 582 of the plurality of second conductive patches 550, 560, 570, and 580 or peak gains (Default±45) 1103 and 1106 of a case in which the feeding points 511, 512, 521, 522, 531, 532, 541, and 542 of the plurality of first conductive patches 510, 520, 530, and 540 are mixed with the feeding points 551, 552, 561, 562, 571, 572, 581, and 582 of the plurality of second conductive patches 550, 560, 570, and 580 to be disposed close to the conductive portion 821.

Figure 12A:
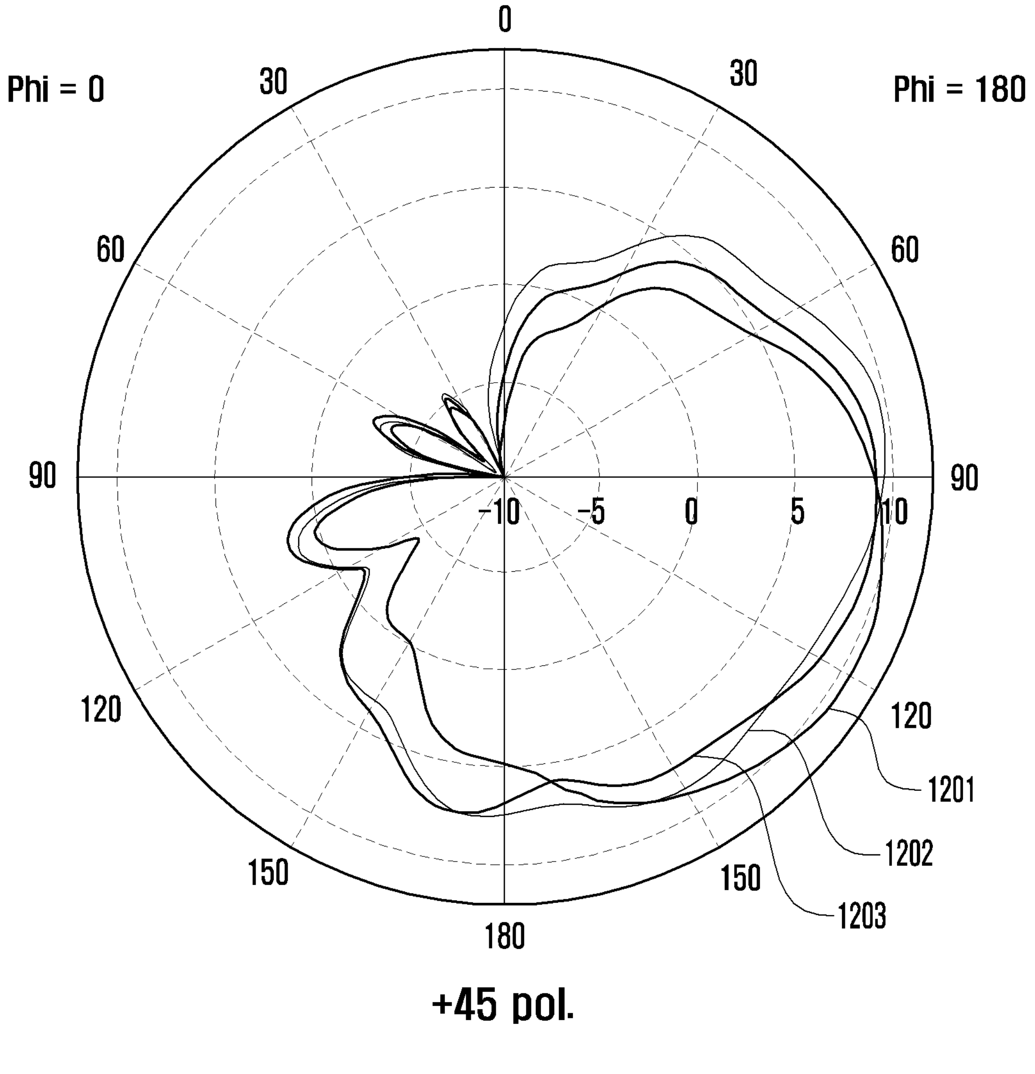
FIGS. 12A and 12B are graphs illustrating a boresight gain performance in a first frequency band according to various embodiments of the disclosure.
Figure 12B:
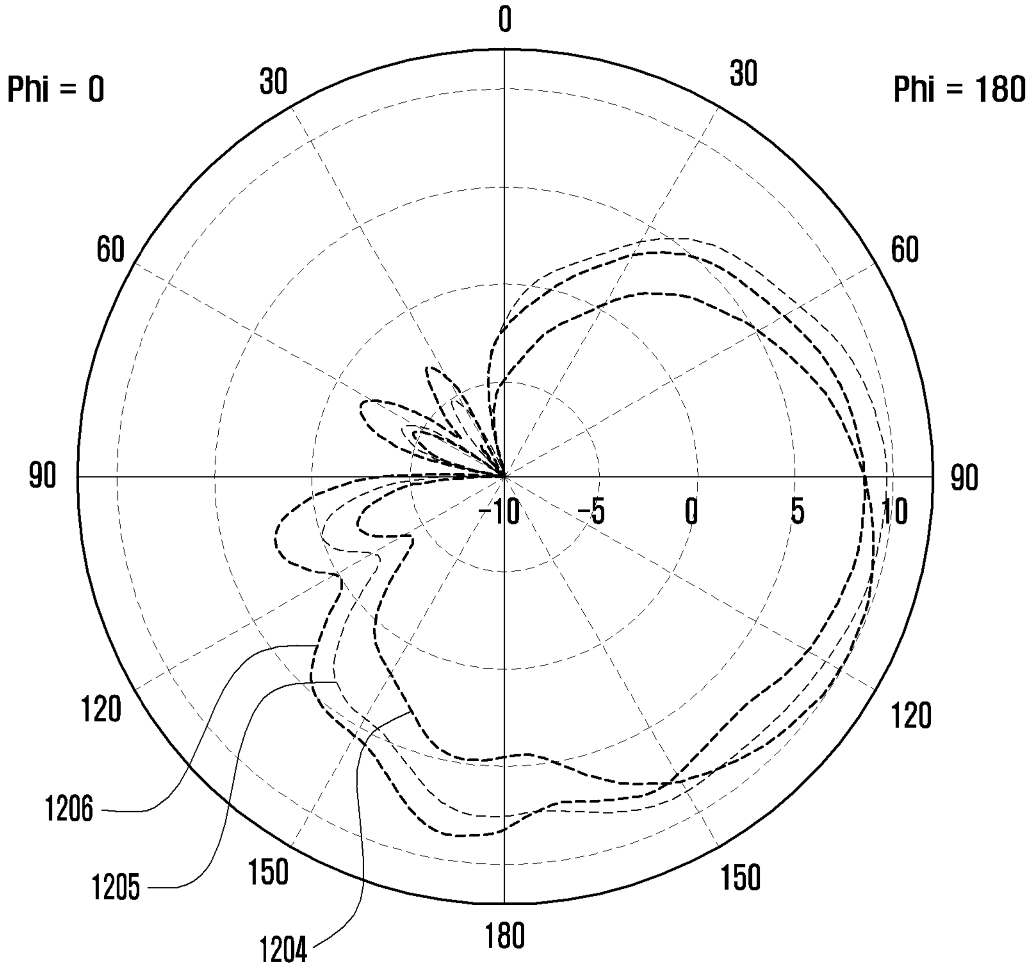

FIGS. 12A and 12B are graphs illustrating a boresight gain performance in a first frequency band according to various embodiments of the disclosure.

Reference to FIGS. 9B, 12A, and 12B, when describing a boresight gain performance of dual polarization exhibited perpendicular to each other in a first frequency band (e.g., 39 GHz) of the antenna module 500, it can be seen that boresight gain performances (LB_feed_up±45) 1201 and 1204 of a case in which the feeding points 511, 512, 521, 522, 531, 532, 541, and 542 of the plurality of first conductive patches 510, 520, 530, and 540 are disposed closer to the conductive portion 821 than the feeding points 551, 552, 561, 562, 571, 572, 581, and 582 of the plurality of second conductive patches 550, 560, 570, and 580 is superior to boresight gain performances (HB_feed_up±45) 1202 and 1205 of a case in which the feeding points 511, 512, 521, 522, 531, 532, 541, and 542 of the plurality of first conductive patches 510, 520, 530, and 540 are disposed farther from the conductive portion 821 than the feeding points 551, 552, 561, 562, 571, 572, 581, and 582 of the plurality of second conductive patches 550, 560, 570, and 580 or boresight gain performances (Default±45) 1203 and 1206 of a case in which the feeding points 511, 512, 521, 522, 531, 532, 541, and 542 of the plurality of first conductive patches 510, 520, 530, and 540 are mixed with the feeding points 551, 552, 561, 562, 571, 572, 581, and 582 of the plurality of second conductive patches 550, 560, 570, and 580 to be disposed close to the conductive portion 821.

Figure 13A:
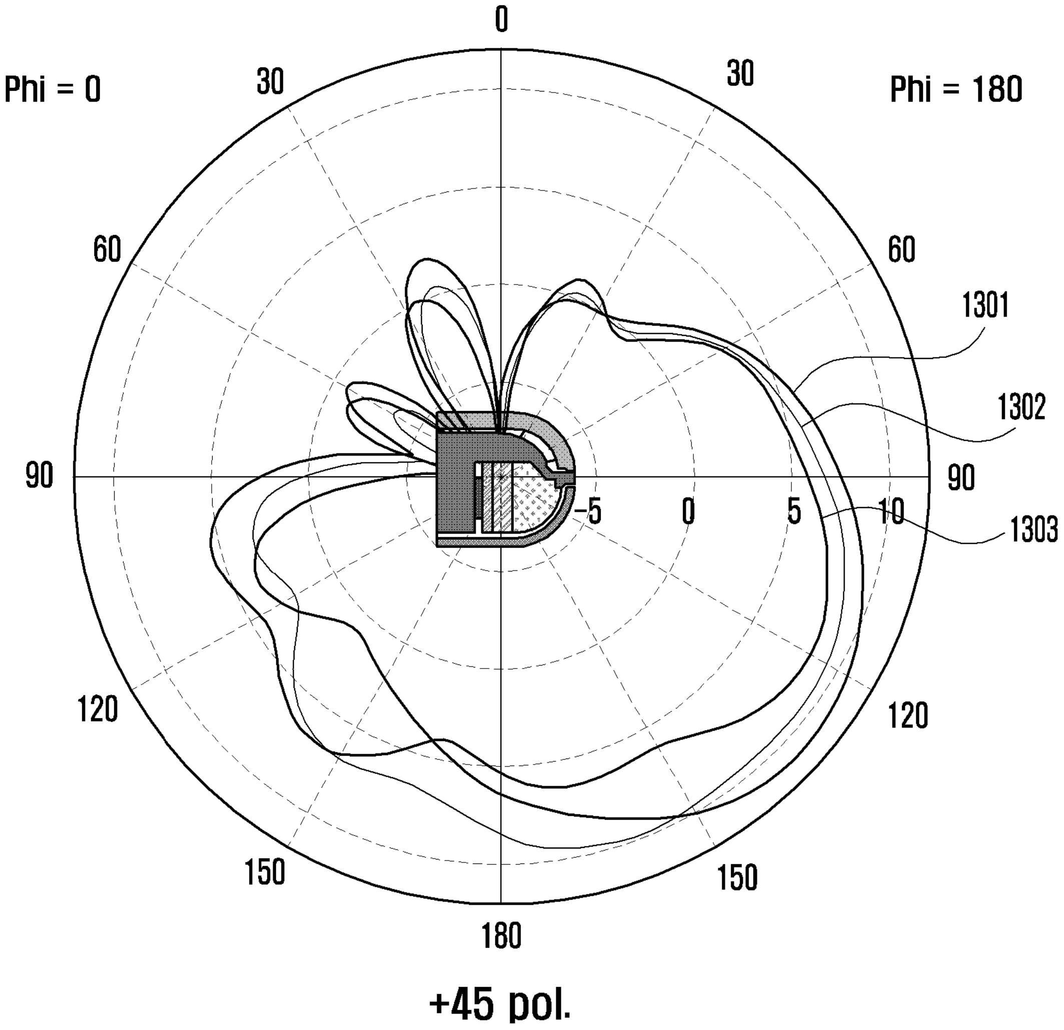
FIGS. 13A and 13B are graphs illustrating a boresight gain performance in a second frequency band according to various embodiments of the disclosure.
Figure 13B:
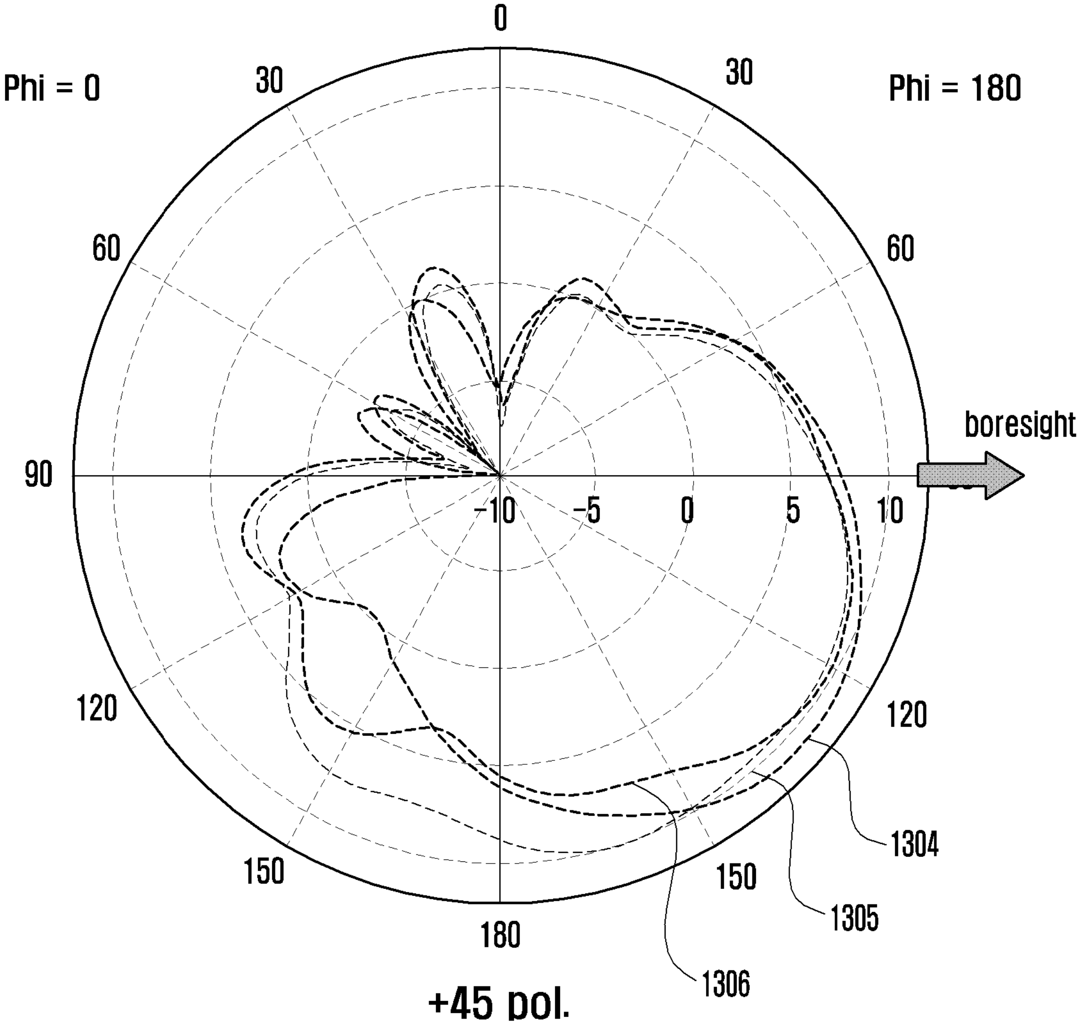

FIGS. 13A and 13B are graphs illustrating a boresight gain performance in a second frequency band according to various embodiments of the disclosure.

Referring to FIGS. 9B, 13A, and 13B, when describing a boresight gain performance of dual polarization exhibited perpendicular to each other in a second frequency band (e.g., 39 GHZ) of the antenna module 500, it can be seen that boresight gain performances (LB_feed_up±45) 1301 and 1304 of a case in which the feeding points 511, 512, 521, 522, 531, 532, 541, and 542 of the plurality of first conductive patches 510, 520, 530, and 540 are disposed closer to the conductive portion 821 than the feeding points 551, 552, 561, 562, 571, 572, 581, and 582 of the plurality of second conductive patches 550, 560, 570, and 580 is exhibited similarly to boresight gain performances (HB_feed_up±45) 1302 and 1305 of a case in which the feeding points 511, 512, 521, 522, 531, 532, 541, and 542 of the plurality of first conductive patches 510, 520, 530, and 540 are disposed farther from the conductive portion 821 than the feeding points 551, 552, 561, 562, 571, 572, 581, and 582 of the plurality of second conductive patches 550, 560, 570, and 580 and is superior to the boresight gain performances (Default±45) 1303 and 1306 of a case in which the feeding points 511, 512, 521, 522, 531, 532, 541, and 542 of the plurality of first conductive patches 510, 520, 530, and 540 are mixed with the feeding points 551, 552, 561, 562, 571, 572, 581, and 582 of the plurality of second conductive patches 550, 560, 570, and 580 to be disposed close to the conductive portion 821.

According to various embodiments of the disclosure, with reference to the above-described graphs, when describing at a gain performance of dual polarization exhibited perpendicular to each other in a first frequency band of the antenna module 500 and/or a second frequency band lower than the first frequency band, it can be seen that a gain performance of a case in which the feeding points 511, 512, 521, 522, 531, 532, 541, and 542 of the plurality of first conductive patches 510, 520, 530, and 540 operating in the first frequency band are disposed closer to the conductive portion 821 than the feeding points 551, 552, 561, 562, 571, 572, 581, and 582 of the plurality of second conductive patches 550, 560, 570, and 580 operating in the second frequency band is the most superior. For example, by spacing feeding points disposed in conductive patches operating in a relatively low frequency band to be farthest away from the conductive portion, the antenna module may assist in exhibiting a maximum radiation performance.

Figure 14:
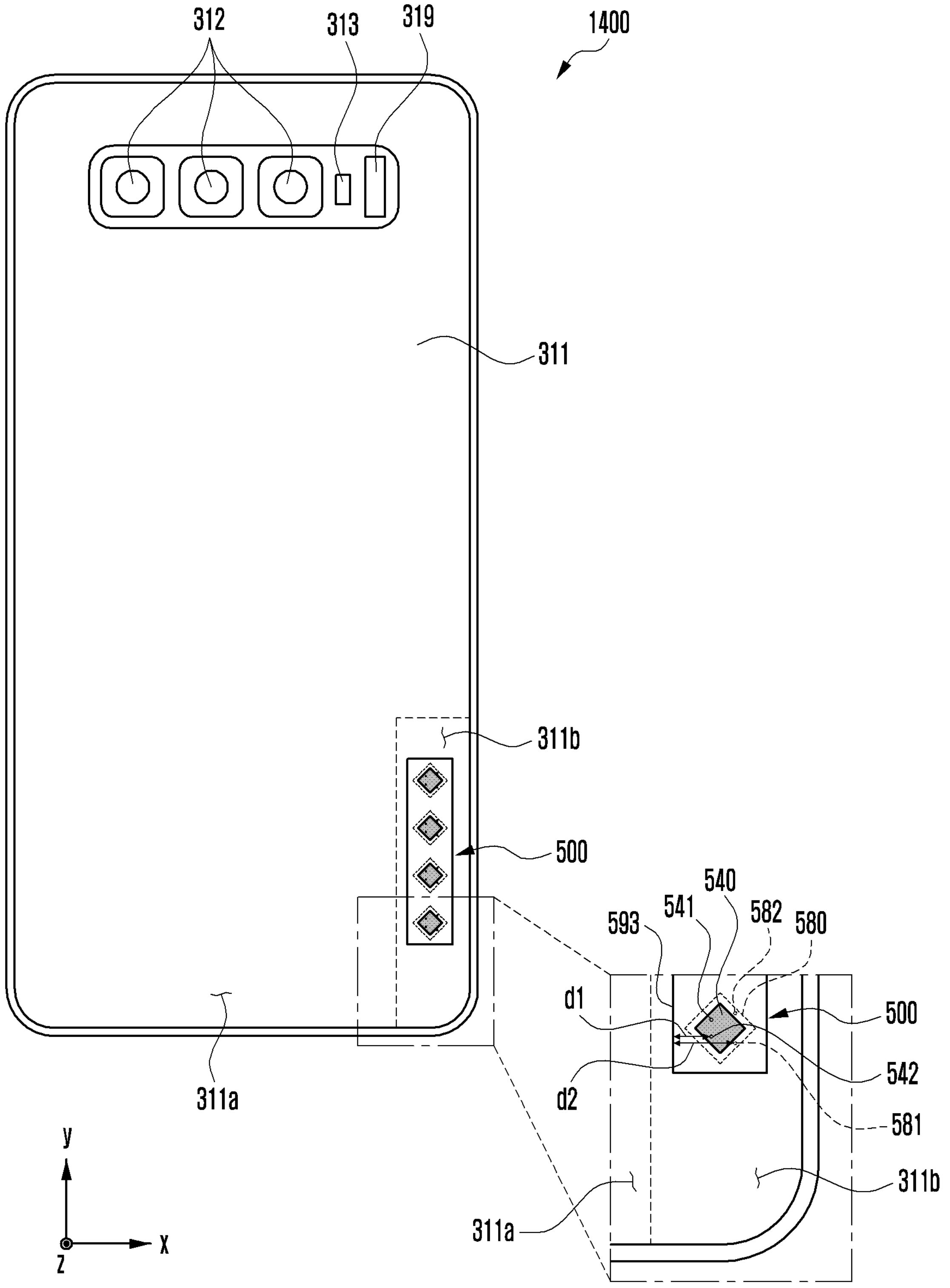
FIG. 14 is a rear view illustrating an electronic device in which an antenna module is disposed according to an embodiment of the disclosure.

FIG. 14 is a rear view illustrating an electronic device in which an antenna module is disposed according to an embodiment of the disclosure.

Because the antenna module 500 of FIG. 14 is substantially the same as the antenna module 500 illustrated in FIGS. 5A and 5B, a detailed description thereof may be omitted.

An electronic device 1400 of FIG. 14 may be at least partially similar to the electronic device 101 of FIG. 1 or the electronic device 300 of FIGS. 3A to 3C or may further include other embodiments of the electronic device.

Referring to FIG. 14, the electronic device 1400 may include an antenna module 500 disposed in an internal space. The antenna module 500 may be disposed to form a beam pattern in a direction (e.g., −Z axis direction) toward a rear plate 311 in the internal space of the electronic device. For example, a plurality of first conductive patches (e.g., the plurality of first conductive patches 510, 520, 530, and 540 of FIG. 5B) operating in a first frequency band of the antenna module 500 and a plurality of second conductive patches (e.g., the plurality of second conductive patches 550, 560, 570, and 580 of FIG. 5B) operating in a second frequency band may be disposed in parallel with the rear plate 311. As illustrated, the disposition relationship of the fourth conductive patch 540 and the eighth conductive patch 580 is described, but the remaining plurality of first conductive patches (e.g., the remaining conductive patches 510, 520, and 530 of FIG. 5B) and the plurality of second conductive patches (e.g., the remaining conductive patches 550, 560, and 570 of FIG. 5B) may also have substantially the same configuration.

The rear plate 311 may include a conductive area 311*a* (e.g., metal member area) and a non-conductive area 311*b* (e.g., polymer area). The conductive area 311*a* may include an area in which the conductive portion disposed in an internal space of the electronic device 1400 overlaps at least a partial area of the rear plate 311 when viewed from above the rear plate 311. The antenna module 500 may be disposed in an area overlapped with the non-conductive area 311*b* when viewed from above the rear plate 311. The seventh feeding point 541 and the eighth feeding point 542 of the fourth conductive patch 540 may be disposed to have the same first vertical distance d1 from the first side 593 of a printed circuit board (e.g., the printed circuit board 590 of FIG. 5B) adjacent to the conductive area 311*a*. A fifteenth feeding point 581 and a sixteenth feeding point 582 of the eighth conductive patch 580 may be disposed to have a second vertical distance d2 longer than the first vertical distance d1 from the first side 593.

In the antenna module 500 according to embodiments of the disclosure, by disposing the feeding points (e.g., the feeding points 511, 512, 521, 522, 531, 532, 541, and 542 of FIG. 5B) of a plurality of first conductive patches (e.g., the plurality of first conductive patches 510, 520, 530, and 540 of FIG. 5B) operating in a high frequency band (e.g., first frequency band) to be closer than feeding points (e.g., the feeding points 551, 552, 561, 562, 571, 572, 581, and 582 of FIG. 5B) of the plurality of second conductive patches (e.g., the plurality of second conductive patches 550, 560, 570, and 580 of FIG. 5B) operating in a relatively low frequency band (e.g., second frequency band), deterioration in radiation performance by conductive portions (e.g., the conductive area 311*a*) disposed around the antenna module can be reduced.

Figure 15A:
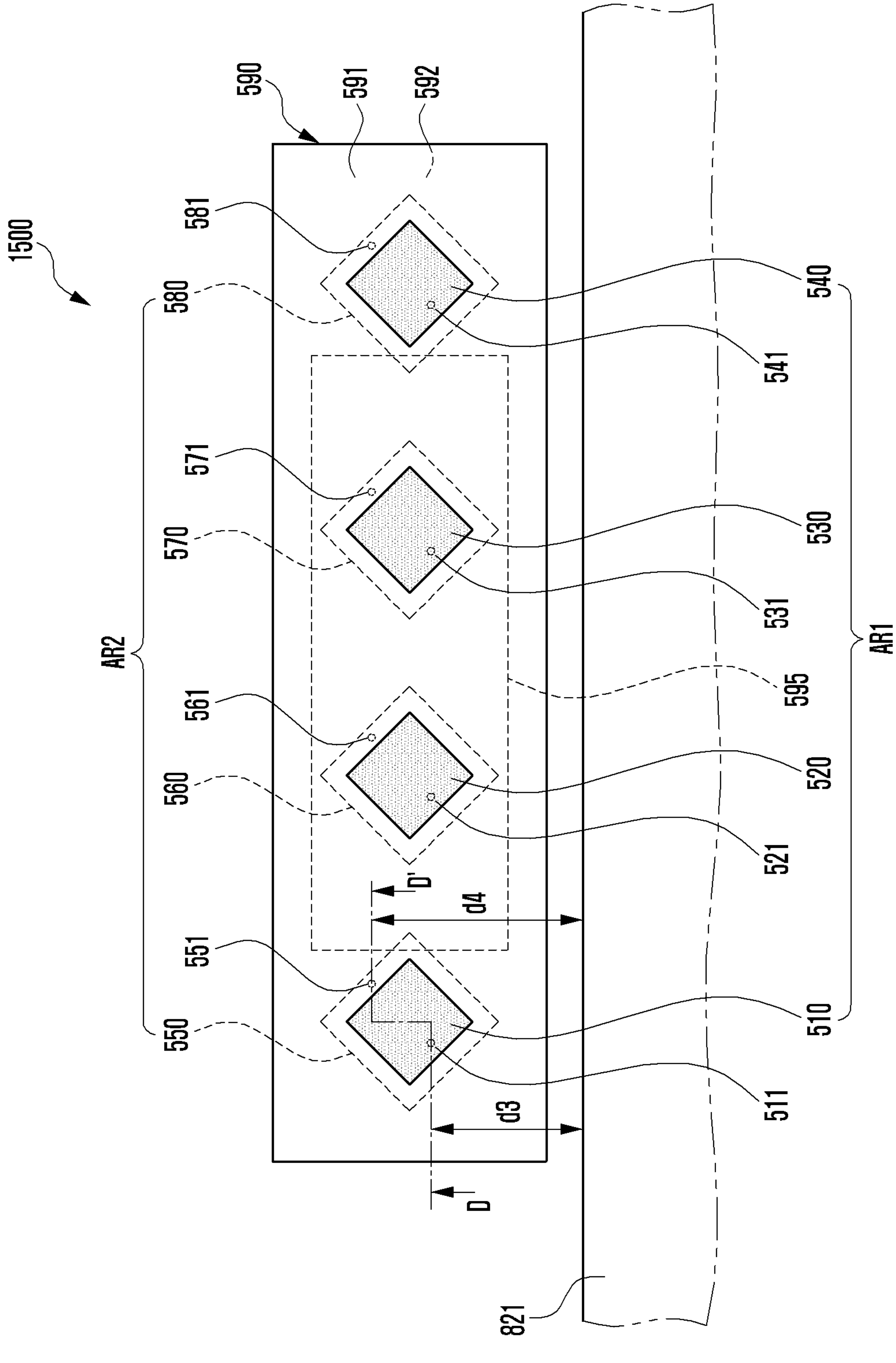
FIG. 15A is a plan view illustrating an antenna module according to an embodiment of the disclosure.
Figure 15B:
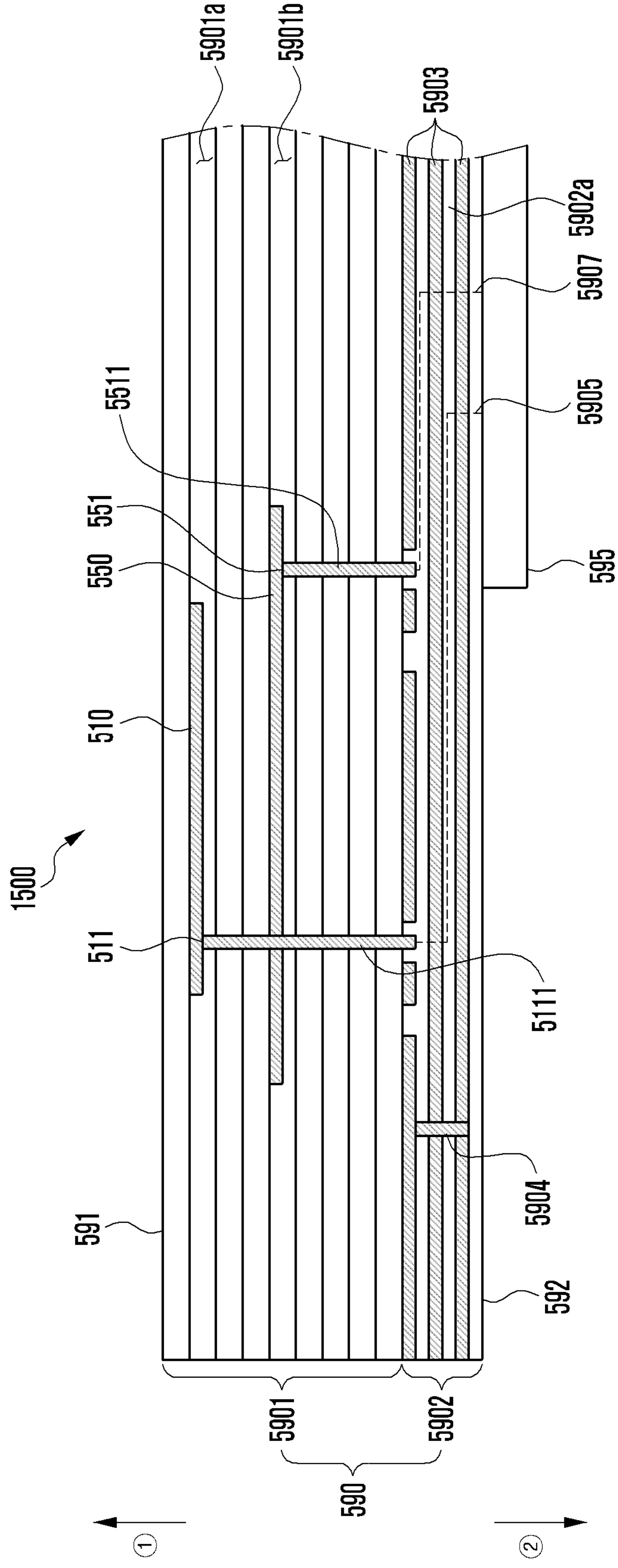
FIG. 15B is a partial cross-sectional view illustrating an antenna module taken along line D-D' of FIG. 15B according to an embodiment of the disclosure.

FIG. 15A is a plan view illustrating an antenna module according to an embodiment of the disclosure. FIG. 15B is a partial cross-sectional view illustrating an antenna module 1500 taken along line D-D' of FIG. 15A according to an embodiment of the disclosure.

The antenna module 1500 of FIG. 15A may be at least partially similar to the third antenna module 246 of FIG. 2 or may further include other components of the antenna module.

Elements of FIGS. 15A and 15B may be substantially the same as those of FIGS. 5A and 5B, and the same reference numerals are used for the same elements, and a detailed description thereof may be omitted.

Referring to FIGS. 15A and 15B, the antenna module 1500 is an antenna structure and may include a first antenna array AR1 including a first conductive patch 510, a second conductive patch 520, a third conductive patch 530, and/or a fourth conductive patch 540 disposed at the first surface 591 of the printed circuit board 590 or disposed close to the first surface 591 inside the printed circuit board 590 and a second antenna array AR2 including a fifth conductive patch 550, a sixth conductive patch 560, a seventh conductive patch 570, and/or an eighth conductive patch 580. The antenna module 1500 may include a wireless communication circuit 595 disposed at the second surface 592 of the printed circuit board 590. The wireless communication circuit 595 may be configured to transmit and/or receive a first signal of a first frequency band through the first antenna array AR1 and to transmit and/or receive a second signal of a second frequency band lower than the first frequency band through the second antenna array AR2.

The antenna module 1500 according to an embodiment of the disclosure may operate as a dual band single polarized antenna module. The plurality of first conductive patches 510, 520, 530, and 540 may include feeding points 511, 521, 531, and 541 having a third vertical distance d3 from the conductive portion 821. The plurality of second conductive patches 550, 560, 570, and 580 may include feeding points 551, 561, 571, and 581 having a fourth vertical distance d4 greater than a third vertical distance d3 from the conductive portion 821. In this case, as the feeding points 511, 521, 531, and 541 disposed in each of the plurality of first conductive patches 510, 520, 530, and 540 operating in a high frequency band (e.g., first frequency band) are disposed closer to the conductive portion 821 than the feeding points 551, 561, 571, and 581 disposed in each of the plurality of second conductive patches 550, 560, 570, and 580 operating in a relatively low frequency band (e.g., second frequency band), degradation in a radiation performance of the antenna module 1500 by the conductive portion 821 disposed around the antenna module can be reduced.

FIGS. 16A to 16F are plan views illustrating antenna modules according to various embodiments of the disclosure.

Antenna modules 1600-1, 1600-2, 1600-3, 1600-4, 1600-5, and 1600-6 of FIGS. 16A to 16F may be at least partially similar to the third antenna module 246 of FIG. 2 or may further include other components of the antenna module.

Figure 16A:
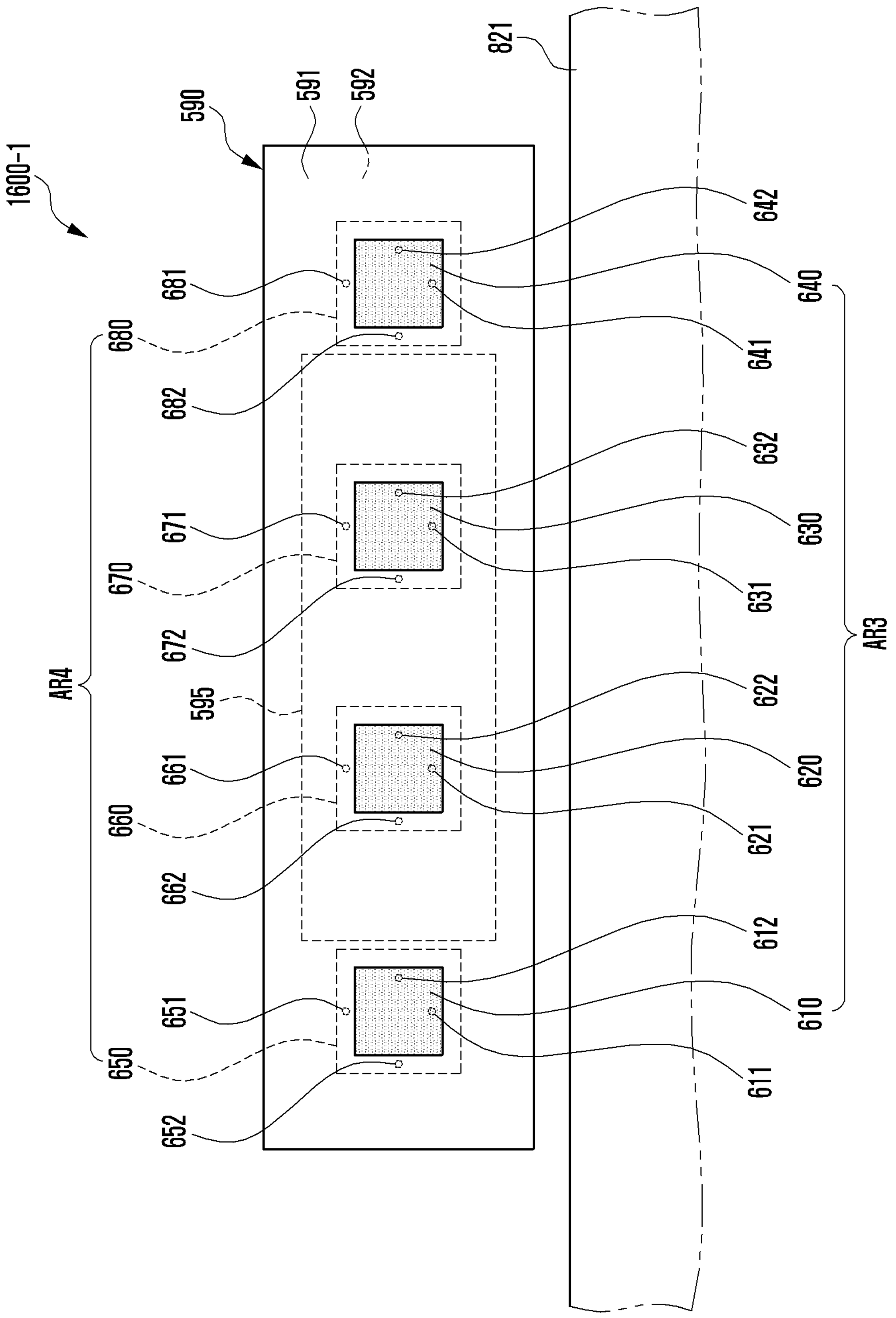
FIGS. 16A, 16B, 16C, 16D, 16E, and 16F are plan views illustrating antenna modules according to various embodiments of the disclosure.

Referring to FIG. 16A, the antenna module 1600-1 is an antenna structure and may include a first antenna array AR3 including a first conductive patch 610, a second conductive patch 620, a third conductive patch 630, and/or a fourth conductive patch 640 disposed at the first surface 591 of the printed circuit board 590 or disposed close to the first surface 591 inside the printed circuit board 590 and a second antenna array AR4 including a fifth conductive patch 650, a sixth conductive patch 660, a seventh conductive patch 670, and/or an eighth conductive patch 680. The antenna module 1600-1 may include a wireless communication circuit 595 disposed at the second surface 592 of the printed circuit board 590. In another embodiment of the disclosure, the wireless communication circuit 595 may be disposed in an internal space of the electronic device spaced apart from the printed circuit board 590, and be electrically connected to the printed circuit board 590 through an electrical connection member. The wireless communication circuit 595 may be configured to transmit and/or receive a first signal of a first frequency band through the first antenna array AR3 and to transmit and/or receive a second signal of a second frequency band lower than the frequency band through the second antenna array AR4.

The antenna module 1600-1 according to an embodiment of the disclosure may include feeding points 611, 621, 631, and 641 disposed at the edge closest to the conductive portion 821 in each of the plurality of first square conductive patches 610, 620, 630, and 640 and feed points 612, 622, 632, and 642 disposed on an imaginary line perpendicular to an imaginary straight line passing through the feeding points 611, 621, 631, and 641 and center points of each of the plurality of first conductive patches 610, 620, 630, and 640. The antenna module 1600-1 may include feeding points 651, 661, 671, and 681 disposed at the edge furthest from the conductive portion 821 and feed points 652, 662, 672, and 682 disposed on an imaginary line perpendicular to an imaginary straight line passing through the feeding points 651, 661, 671, and 681 and center points of each of the plurality of second conductive patches 650, 660, 670, and 680, at each of the plurality of second square conductive patches 650, 660, 670, and 680. In this case, the feeding points 651, 652, 661, 662, 671, 672, 681, and 682 of the plurality of second conductive patches 650, 660, 670, and 680 operating in the second frequency band may be disposed to have a distance farther from the conductive portion 821 than the feeding points 611, 621, 631, and 641 of the plurality of first conductive patches 610, 620, 630, and 640 operating in a first frequency band higher than the second frequency band.

Figure 16B:
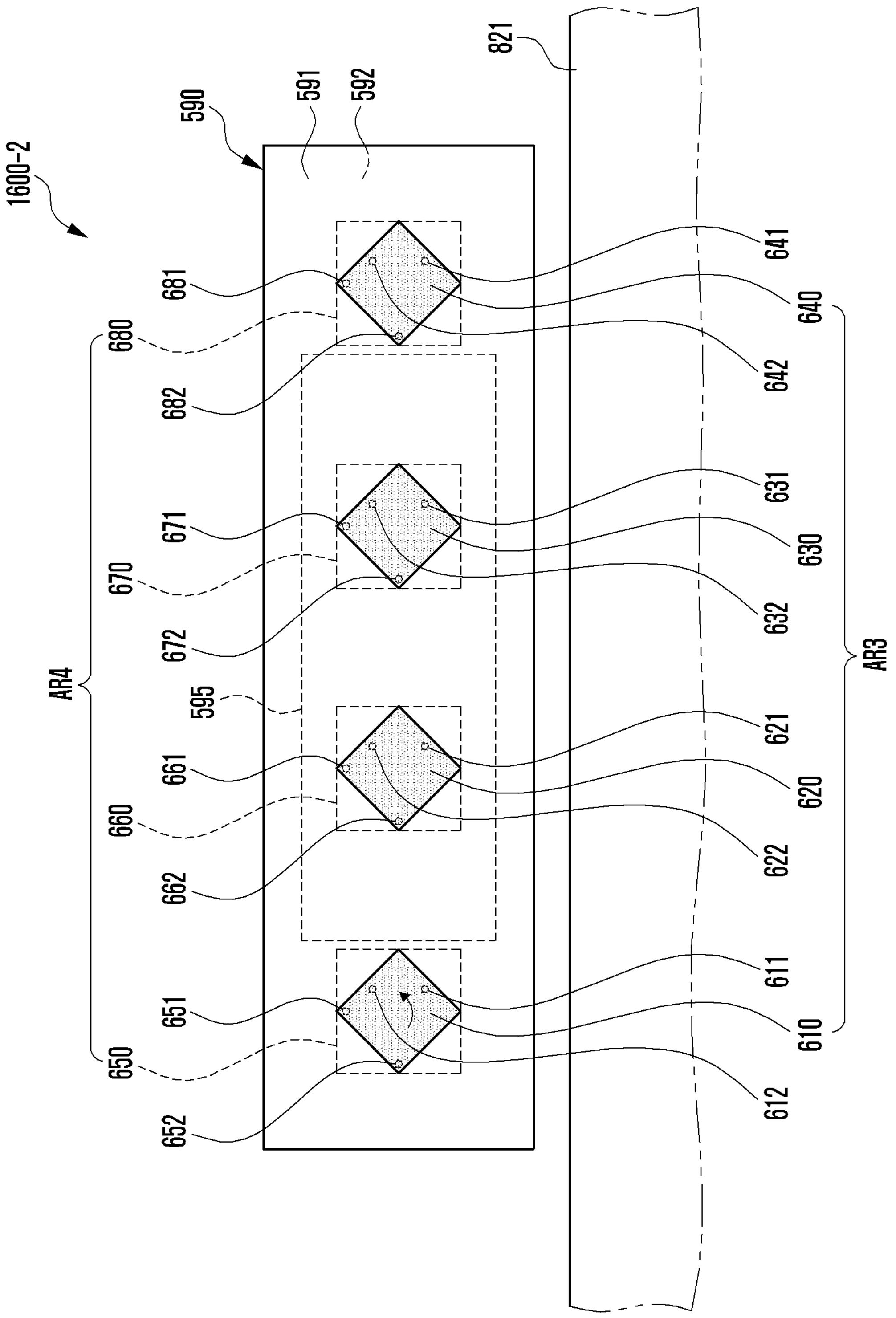

Referring to FIG. 16B, an antenna module 1600-2 may include a state in which only the plurality of first conductive patches 610, 620, 630, and 640 are rotated by 90° counterclockwise (illustrated arrow direction) together with feeding points 611, 612, 621, 622, 631, 632, 641, and 642 in the configuration of the antenna module 1600-1 substantially the same as that of FIG. 16A. In this case, the feeding points 611, 621, 631, and 641 of the plurality of first conductive patches 610, 620, 630, and 640 operating in the first frequency band may be disposed to have a closer distance to the conductive portion 821 than the feeding points 651, 652, 661, 662, 671, 672, 681, and 682 of the plurality of second conductive patches 650, 660, 670, and 680 operating in a second frequency band lower than the first frequency band.

Figure 16C:
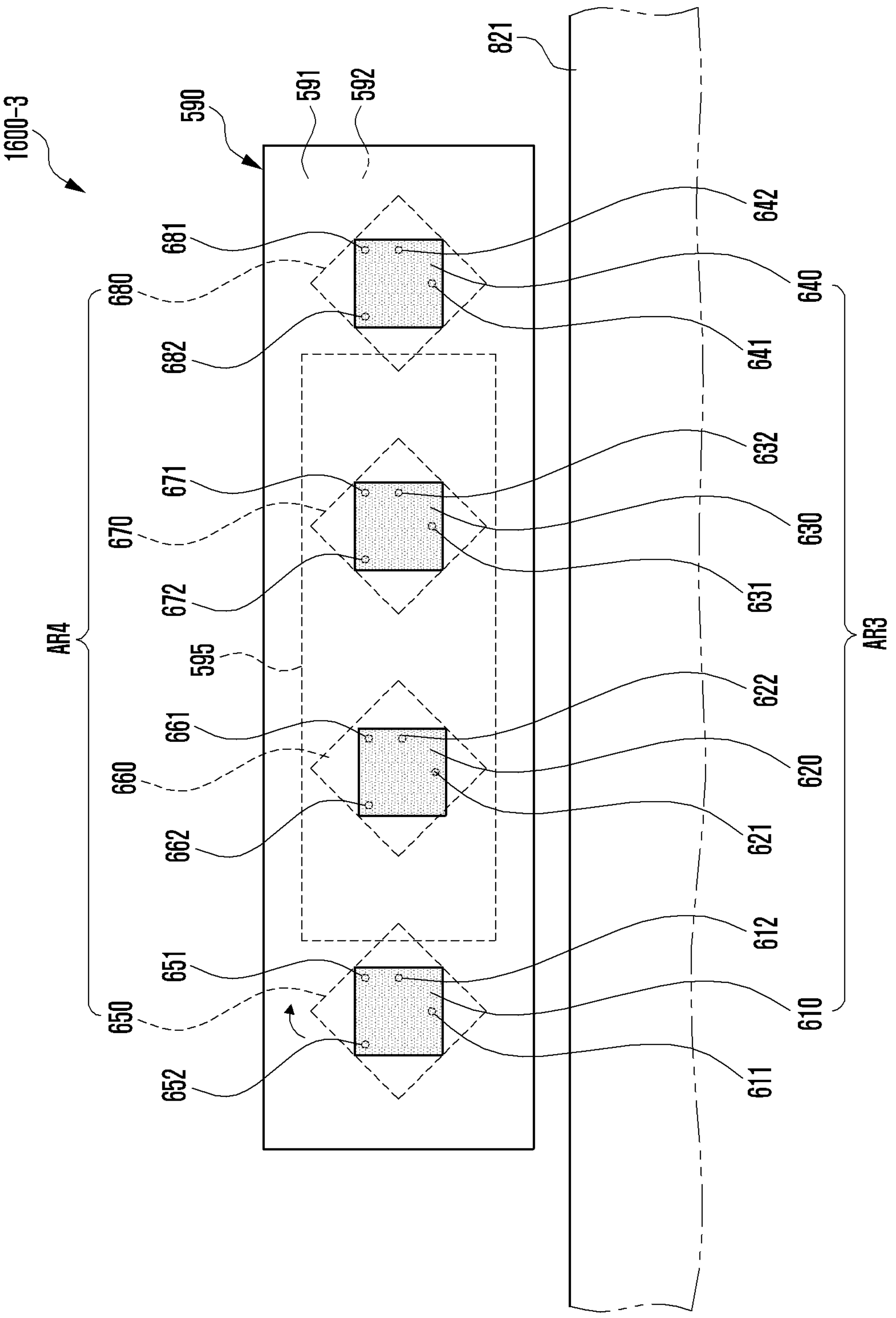

Referring to FIG. 16C, an antenna module 1600-3 may include a state in which only the plurality of second conductive patches 650, 660, 670, and 680 are rotated by 90° clockwise (illustrated arrow direction) together with the feeding points 651, 652, 661, 662, 671, 672, 681, and 682 in the configuration of the antenna module 1600-1 substantially the same as that of FIG. 16A. In this case, all feeding points 651, 652, 661, 662, 671, 672, 681, and 682 of the plurality of second conductive patches 650, 660, 670, and 680 operating in the second frequency band may be disposed to have a distance farther from the conductive portion 821 than all feeding points 611, 612, 621, 622, 631, 632, 641, and 642 of the plurality of first conductive patches 610, 620, 630, and 640 operating in the first frequency band higher than the second frequency band.

Figure 16D:
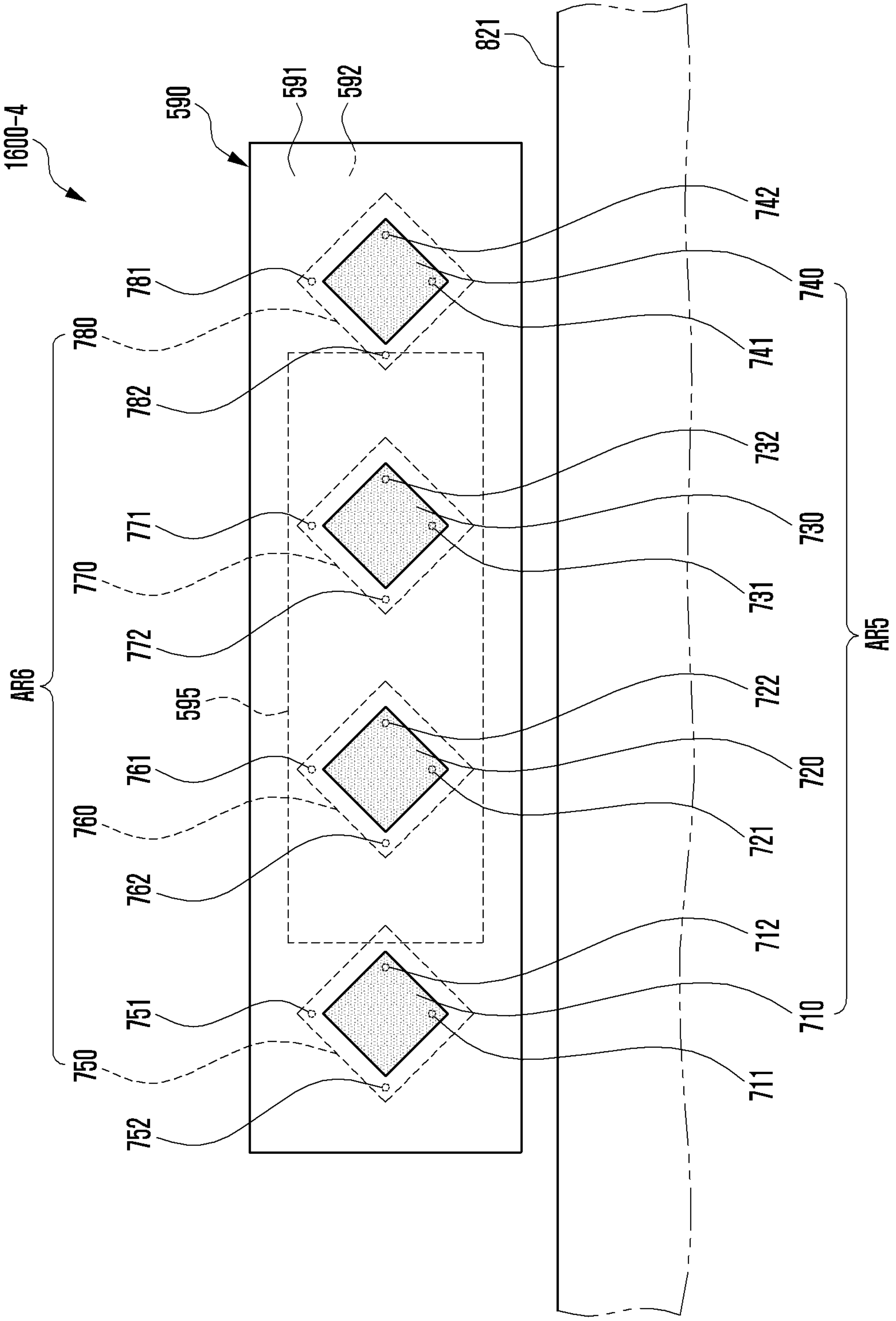

Referring to FIG. 16D, an antenna module 1600-4 is an antenna structure and may include a first antenna array AR5 including a first conductive patch 710, a second conductive patch 720, a third conductive patch 730, and/or a fourth conductive patch 740 disposed at the first surface 591 of the printed circuit board 590 or disposed close to the first surface 591 inside the printed circuit board 590, and a second antenna array AR6 including a fifth conductive patch 750, a sixth conductive patch 760, a seventh conductive patch 770, and/or an eighth conductive patch 780. According to an embodiment, the antenna module 1600-4 may include a wireless communication circuit 595 disposed at the second surface 592 of the printed circuit board 590. In another embodiment, the wireless communication circuit 595 may be disposed in an internal space of the electronic device spaced apart from the printed circuit board 590 and be electrically connected to the printed circuit board 590 through an electrical connection member. According to an embodiment, the wireless communication circuit 595 may be configured to transmit and/or receive a first signal of a first frequency band through the first antenna array AR5 and to transmit and/or receive a second signal of a second frequency band lower than the frequency band through the second antenna array AR6.

The antenna module 1600-4 according to an embodiment of the disclosure may be disposed to have the same shape as that of the first antenna array AR1 and the second antenna array AR2 of FIG. 5A, and positions of the feeding points may be changed. For example, the antenna module 1600-4 may include feeding points 711, 721, 731, and 741 disposed at a corner closest to the conductive portion 821 in each of the plurality of first conductive patches 710, 720, 730, and 740 and feeding points 712, 722, 732, and 742 disposed on an imaginary straight line perpendicular to an imaginary straight line passing through the feeding points 711, 721, 731, and 741 and the center of the plurality of first conductive patches 710, 720, 730, and 740. The antenna module 1600-4 may include feeding points 751, 761, 771, and 781 disposed at the corner furthest from the conductive portion 821 and feeding points 752, 762, 772, and 782 disposed on an imaginary straight line perpendicular to an imaginary straight line passing through the feeding points 751, 761, 771, and 781 and the center of the plurality of second conductive patches 750, 760, 770, and 780 at each of the plurality of second conductive patches 750, 760, 770, and 780. In this case, the feeding points 751, 752, 761, 762, 771, 772, 781, and 782 of the plurality of second conductive patches 750, 760, 770, and 780 operating in the second frequency band may be disposed to have a distance farther from the conductive portion 821 than the feeding points 711, 721, 731, and 741 of the plurality of first conductive patches 710, 720, 730, and 740 operating in the first frequency band higher than the second frequency band.

Figure 16E:
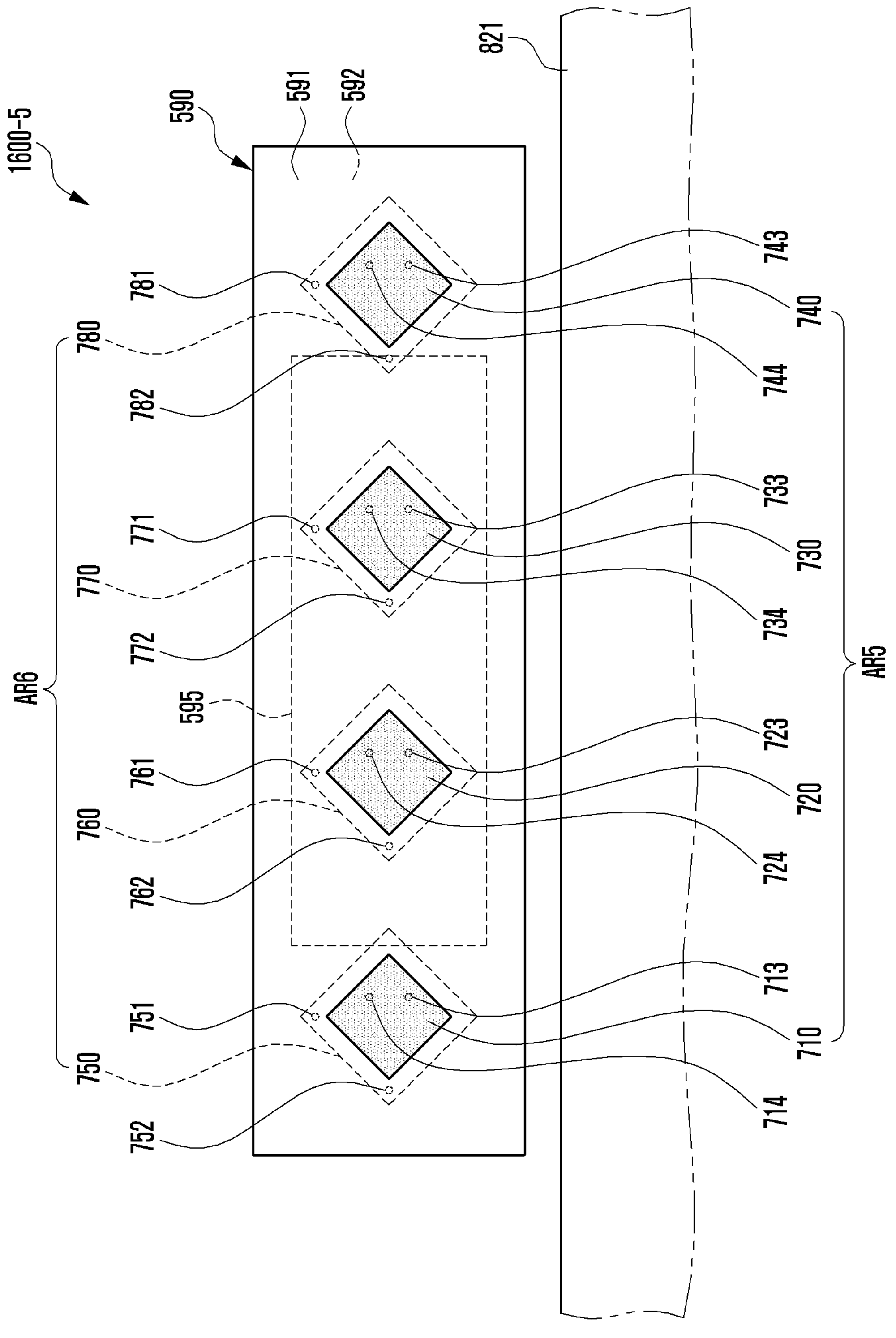

Referring to FIG. 16E, an antenna module 1600-5 may include new feeding points 713, 714, 723, 724, 733, 734, 743, and 744 formed when feeding points 711, 712, 721, 722, 731, 732, 741, and 742 of the plurality of first conductive patches 710, 720, 730, and 740 move from each corner to the center of an adjacent side (e.g., a side positioned in a right direction from the corner) in the configuration of substantially the same antenna arrays AR5 and AR6 as those of FIG. 16D. In this case, the feeding points 751, 752, 761, 762, 771, 772, 781, and 782 of the plurality of second conductive patches 750, 760, 770, and 780 operating in the second frequency band may be disposed to have a distance farther from the conductive portion 821 than the feeding points 713, 723, 733, and 743 of the plurality of first conductive patches 710, 720, 730, and 740 operating in a first frequency band higher than a second frequency band.

Figure 16F:
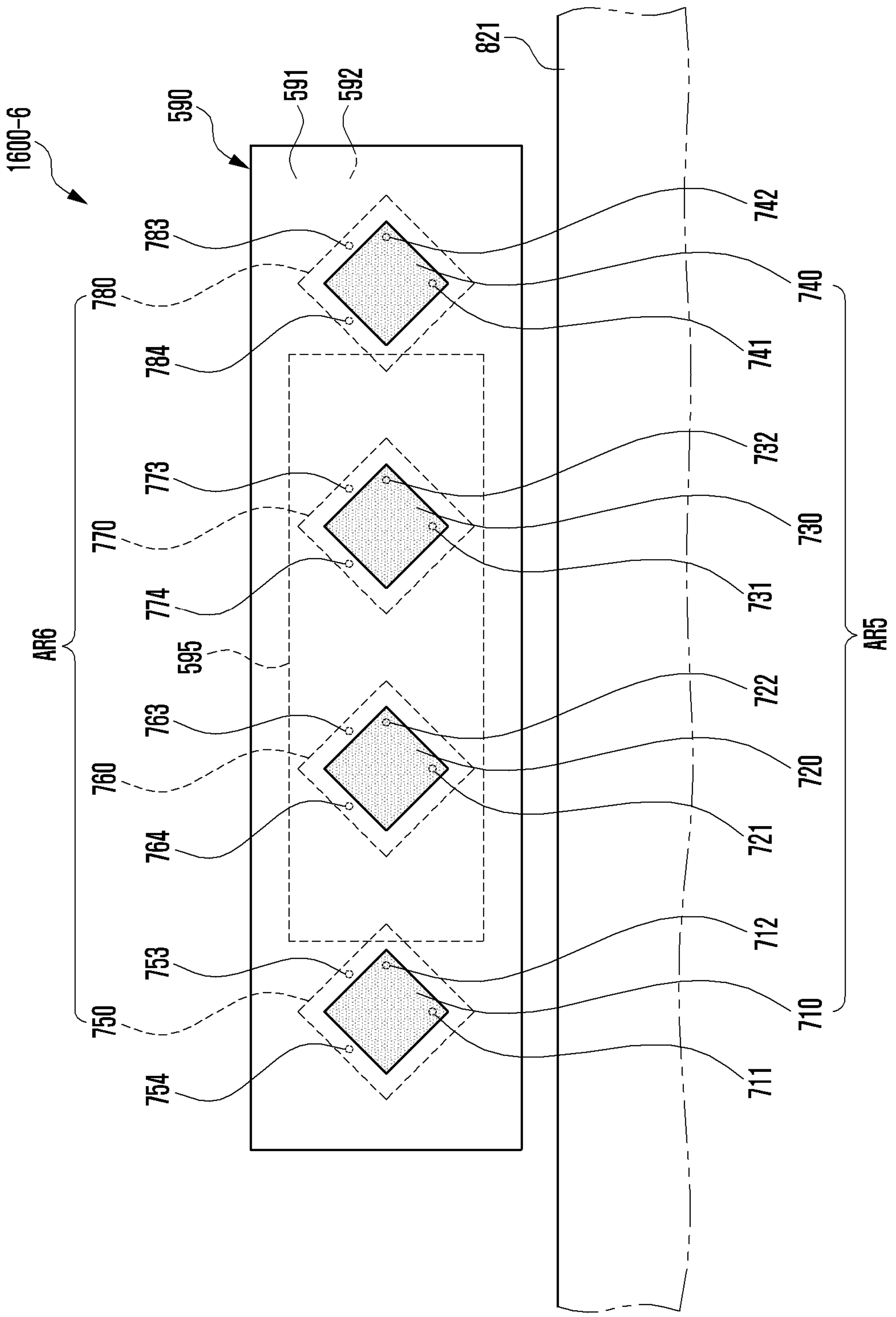

Referring to FIG. 16F, an antenna module 1600-6 may include new feeding points 753, 754, 763, 764, 773, 774, 783, and 784 formed when the feeding points 751, 752, 761, 762, 771, 772, 781, and 782 of the plurality of second conductive patches 750, 760, 770, and 780 move from each corner to the center of the adjacent side (e.g., a side positioned to a right direction from the corner) in the configuration of substantially the same the antenna arrays AR5 and AR6 as that of FIG. 16D. In this case, all changed feeding points 753, 754, 763, 764, 773, 774, 783, and 784 of the plurality of second conductive patches 750, 760, 770, and 780 operating in the second frequency band may be disposed to have a distance farther from the conductive portion 821 than all feeding points 711, 712, 721, 722, 731, 732, 741, and 742 of the plurality of first conductive patches 710, 720, 730, and 740 operating in a first frequency band higher than the second frequency band.

A dual band antenna module according to various embodiments of the disclosure disposes feeding points of a conductive patch operating in a low frequency band to be farther from a conductive member than feeding points of a conductive patch operating in a relatively high frequency band, thereby assisting to improve a radiating performance.

According to various embodiments of the present disclosure, an electronic device may include a housing (e.g., the housing 810 of FIG. 9A) at least partially including a conductive portion (e.g., the conductive portion 821 of FIG. 9A); an antenna structure disposed in an internal space of the housing, wherein the antenna structure may include a printed circuit board (e.g., the printed circuit board 590 of FIG. 5B) including a plurality of insulating layers; at least one first conductive patch (e.g., the first conductive patch 510 of FIG. 5B) disposed at a first insulating layer (e.g., the first insulating layer 5901*a* of FIG. 6) of the plurality of insulating layers, wherein at least one first conductive patch may include a first feeding point (e.g., the first feeding point 511 of FIG. 5B) disposed on a first imaginary line (e.g., the first imaginary line L1 of FIG. 5B) passing through the center of the first conductive patch; and a second feeding point (e.g., the second feeding point 512 of FIG. 5B) passing through the center and disposed on a second imaginary line (e.g., the second imaginary line L2 of FIG. 5B) perpendicular to the first imaginary line, wherein the first feeding point and the second feeding point have a same first vertical distance (e.g., the first vertical distance d1 of FIG. 5B) from a first side (e.g., the first side 593 of FIG. 5B) of the printed circuit board adjacent to the conductive portion; and at least one second conductive patch (e.g., the fifth conductive patch 550 of FIG. 5B) overlapped at least partially to have the same center as that of the first conductive patch when viewed from above the first conductive patch in a second insulating layer (e.g., the second insulating layer 5901*b* of FIG. 6) different from the first insulating layer, wherein at least one second conductive patch may include a third feeding point (e.g., the ninth feeding point 551 of FIG. 5B) disposed on the first imaginary line; and a fourth feeding point (e.g., the tenth feeding point 552 of FIG. 5B) disposed on the second imaginary line, wherein the third feeding point and the fourth feeding point have the same second vertical distance (e.g., the second vertical distance d2 of FIG. 5B) longer than the first vertical distance from the first side; and an antenna module including a wireless communication circuit (e.g., the wireless communication circuit 595 of FIG. 5B) configured to transmit and/or receive a first signal of a first frequency band through the at least one first conductive patch and to transmit and/or receive a second signal of a second frequency band lower than the first frequency band through the at least one second conductive patch.

The wireless communication circuit may be configured to transmit and/or receive a signal having a frequency in the range of about 3 GHz to 100 GHz through the at least one first conductive patch and/or the at least one second conductive patch.

The wireless communication circuit may be configured to transmit and/or receive a signal having first polarization through the first feeding point in the first frequency band.

The wireless communication circuit may be configured to transmit and/or receive a signal having second polarization perpendicular to the first polarization through the second feeding point in the first frequency band.

The wireless communication circuit may be configured to transmit and/or receive a signal having third polarization equal to the first polarization through the third feeding point in the second frequency band.

The wireless communication circuit may be configured to transmit and/or receive a signal having fourth polarization equal to the second polarization through the fourth feeding point in the second frequency band.

The printed circuit board may include a first surface (e.g., the first surface 591 of FIG. 6) and a second surface (e.g., the second surface 592 of FIG. 6) facing in a direction opposite to that of the first surface, and wherein the at least one first conductive patch may be disposed closer to the first surface than the at least one second conductive patch.

The wireless communication circuit may be disposed at the second surface of the printed circuit board.

The at least one first conductive patch may be formed in a smaller size than that of the at least one second conductive patch.

The at least one first conductive patch and the at least one second conductive patch may be formed in the same shape.

The first feeding point and/or the second feeding point may be configured to be in direct contact with or capacitively coupled to the at least one first conductive patch through a first feeding portion (e.g., the first feeding portion 5111 of FIG. 6) and/or a second feeding portion (e.g., the second feeding portion 5121 of FIG. 6) vertically penetrating at least some of the plurality of insulating layers.

The third feeding point and/or the fourth feeding point may be configured to be in direct contact with or capacitively coupled to the at least one second conductive patch through a third feeding portion (e.g., the ninth feeding portion 5511 of FIG. 6) and/or a fourth feeding portion (e.g., the tenth feeding portion 5521 of FIG. 6) vertically penetrating at least some of the plurality of insulating layers.

The housing (e.g., the housing 810 of FIG. 9A) may include a front cover (e.g., the front plate 830 of FIG. 9A); a rear cover (e.g., the rear plate 840 of FIG. 9A) facing in a direction opposite to that of the front cover; and a side member (e.g., the side member 820 of FIG. 9A) enclosing the space (e.g., the space 8001 of FIG. 9A) between the front cover and the rear cover and at least partially including the conductive portion (e.g., the conductive portion 821 of FIG. 9A), wherein the antenna module may be disposed to form a beam pattern in a direction toward the side member.

The housing (e.g., the housing 310 of FIG. 3A) may include a front cover (e.g., the front plate 302 of FIG. 3C); a rear cover (e.g., the rear plate 311 of FIG. 3C) facing in a direction opposite to that of the front cover; and a side member (e.g., the lateral bezel structure 320 of FIG. 3C) enclosing the space between the front cover and the rear cover, wherein the conductive portion (e.g., the conductive area 311*a* of FIG. 14) may be disposed at a position overlapped with at least a partial area of the rear cover when viewed from above the rear cover, and the antenna module may be disposed to form a beam pattern in the direction toward the rear cover.

The rear cover may further include a non-conductive member (e.g., the non-conductive area 311*b* of FIG. 14) disposed in an area facing the at least one first conductive patch and the at least one second conductive patch of the antenna module.

The electronic device may further include a display (e.g., the display 301 of FIG. 3C) disposed to be at least partially visible from the outside through the front cover in an internal space thereof.

According to various embodiments of the present disclosure, an electronic device may include a housing (e.g., the housing 810 of FIG. 9A); a conductive member (e.g., the conductive portion 821 of FIG. 9A) included in the housing or disposed inside the housing; an antenna structure disposed in an internal space of the housing, wherein the antenna structure may include a printed circuit board (e.g., the printed circuit board 590 of FIG. 15A) including a plurality of insulating layers; at least one first conductive patch (e.g., the first conductive patch 510 of FIG. 15A) disposed at a first insulating layer (e.g., the first insulating layer 5901*a* of FIG. 15B) of the plurality of insulating layers and including a first feeding point (e.g., the first feeding point 511 of FIG. 15A) spaced apart from the conductive member by a first distance (e.g., the third distance d3 of FIG. 15A); at least one second conductive patch at least partially overlapped to have the same center as that of the first conductive patch and including a second feeding point (e.g., the second feeding point 551 of FIG. 15A) spaced apart from the conductive member by a second distance (e.g., the fourth distance d4 of FIG. 15A) longer than the first distance, when viewed from above the first conductive patch in a second insulating layer (e.g., the second insulating layer 5901*b* of FIG. 15B) different from the first insulating layer; and a wireless communication circuit (e.g., the wireless communication circuit 595 of FIG. 15A) configured to be electrically connected to the first feeding point, to transmit and/or receive a first signal of a first frequency band through the first conductive patch, to be electrically connected to the second feeding point, and to transmit and/or receive a second signal of a second frequency band lower than the first frequency band through the second conductive patch.

The first feeding point may be disposed on a first imaginary line passing through the center of the first conductive patch, the first conductive patch may include a third feeding point passing through the center, disposed on a second imaginary line perpendicular to the first imaginary line, and spaced apart from the conductive member by a third distance, the second feeding point may be disposed on a third imaginary line passing through the center of the second conductive patch, the second conductive patch may include a fourth feeding point passing through the center, disposed on a fourth imaginary line perpendicular to the third imaginary line, and spaced apart from the conductive member by a fourth distance, and the wireless communication circuit may be configured to be electrically connected to the third feeding point, to transmit and/or receive a third signal of a first frequency band through the first conductive patch, to be electrically connected to the fourth feeding point, and to transmit and/or receive a fourth signal of a second frequency band lower than the first frequency band through the second conductive patch.

The first imaginary line may be the same as the third imaginary line, and the second imaginary line may be the same as the fourth imaginary line.

The first signal and the second signal may have first polarization, and the third signal and the fourth signal may have second polarization different from the first polarization.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:

a housing;

a display;

a support member disposed between the display and a surface of the portable communication device;

an antenna structure disposed in an internal space of the housing, the antenna structure including:

a printed circuit board (PCB) including a first insulating layer and a second insulating layer, the first and second insulating layers overlapping each other when viewed from above, the PCB including a first side and a second side longer than the first side, a first conductive patch disposed at the first insulating layer, the first conductive patch including a first feeding point and a second feeding point formed therein such that a first imaginary line passing through a center of the first conductive patch and the first feeding point is substantially perpendicular to a second imaginary line passing through the center of the first conductive patch and the second feeding point, and that each of the first feeding point and the second feeding point is spaced apart from the second side by a substantially same first distance, and a second conductive patch disposed at the second insulating layer, the second conductive patch including a third feeding point and a fourth feeding point formed therein such that each of the third feeding point and the fourth feeding point is spaced apart from the second side by a substantially same second distance, the second distance being different from the first distance; and a wireless communication circuit configured to;

transmit or receive a first signal corresponding to a first frequency band through the first conductive patch, and transmit or receive a second signal corresponding to a second frequency band, different from the first frequency band, through the second conductive patch, wherein the antenna structure is mounted in a module mounting portion provided in the support member.

2. The portable communication device of claim 1, further comprising:

a first surface;

a second surface facing in a direction opposite to the first surface; and a lateral surface enclosing the internal space of the housing between the first surface and the second surface, wherein the display is disposed to be at least partially visible from outside of the portable communication device through the first surface.

3. The portable communication device of claim 2, wherein the support member is integrally formed with the housing.

4. The portable communication device of claim 2, wherein the antenna structure is mounted in the internal space such that the first conductive patch and the second conductive patch face the lateral surface.

5. The portable communication device of claim 4, wherein the antenna structure is disposed in the internal space of the housing such that the second side is disposed closer to the second surface than the first surface.

6. The portable communication device of claim 2, wherein the first insulating layer is disposed closer to the second surface than the second insulating layer.

7. The portable communication device of claim 1, wherein the first conductive patch is formed in a smaller size than that of the second conductive patch.

8. The portable communication device of claim 1, wherein the second frequency band is lower than the first frequency band.

9. The portable communication device of claim 1, wherein the first distance is shorter than the second distance.

10. The portable communication device of claim 1, wherein the first feeding point is spaced apart from the first side by a third distance, and wherein the third feeding point is spaced apart from the first side by a fourth distance different from the third distance.

11. The portable communication device of claim 10, wherein the fourth distance is longer than the third distance.

12. The portable communication device of claim 1, wherein the antenna structure further comprises five first conductive patches disposed at the first insulating layer.

13. The portable communication device of claim 1, wherein the antenna structure further comprises five second conductive patches disposed at the second insulating layer.

14. The portable communication device of claim 13, wherein the five second conductive patches are disposed such that there is a substantially same distance between a center of each of the five second conductive patches and the second side of the PCB.

15. A portable communication device comprising:

a housing comprising a first cover, a second cover facing in a direction opposite to the first cover, and a lateral member enclosing a space between the first cover and the second cover;

a display disposed to be at least partially visible from outside of the portable communication device through the first cover;

a support member disposed between the display and a surface of the portable communication device;

an antenna structure disposed in the space of the housing, the antenna structure including:

a printed circuit board (PCB) including a first insulating layer and a second insulating layer sharing a center with each other when viewed from above, the PCB including a first side and a second side longer than the first side, a first conductive patch disposed at the first insulating layer, the first conductive patch including a first feeding point and a second feeding point formed therein such that a first imaginary line passing through a center of the first conductive patch and the first feeding point is substantially perpendicular to a second imaginary line passing through the center of the first conductive patch and the second feeding point, and that each of the first feeding point and the second feeding point is spaced apart from the second side by a substantially same first distance, and a second conductive patch disposed at the second insulating layer, the second conductive patch including a third feeding point and a fourth feeding point formed therein such that each of the third feeding point and the fourth feeding point is spaced apart from the second side by a substantially same second distance, the second distance being different from the first distance; and a wireless communication circuit configured to:

transmit or receive a first signal corresponding to a first frequency band through the first conductive patch, and transmit or receive a second signal corresponding to a second frequency band, different from the first frequency band, through the second conductive patch, wherein the antenna structure is mounted in a module mounting portion provided in the support member such that the first conductive patch and the second conductive patch face the second cover.

16. The portable communication device of claim 15, wherein the antenna structure further comprises at least four first conductive patches disposed at the first insulating layer.

17. The portable communication device of claim 16, wherein the at least four first conductive patches comprise a first antenna array.

18. The portable communication device of claim 15, wherein the antenna structure further comprises at least four second conductive patches disposed at the second insulating layer.

19. The portable communication device of claim 18, wherein the at least four second conductive patches comprise a second antenna array.

20. The portable communication device of claim 19, wherein the at least four second conductive patches are disposed such that there is a substantially same distance between a center of each of the at least four second conductive patches and the second side of the PCB.

* * * * *